(12) United States Patent
Fukagawa

(10) Patent No.: US 9,822,201 B2
(45) Date of Patent: Nov. 21, 2017

(54) REFLECTIVE PARTICLE, PARTICLE DISPERSION LIQUID, DISPLAY MEDIUM, AND DISPLAY DEVICE

(71) Applicant: FUJIFILM Corporation, Tokyo (JP)

(72) Inventor: Reiko Fukagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

(21) Appl. No.: 14/828,128

(22) Filed: Aug. 17, 2015

(65) Prior Publication Data

US 2015/0353661 A1 Dec. 10, 2015

Related U.S. Application Data

(63) Continuation of application No. PCT/JP2013/079908, filed on Nov. 5, 2013.

(30) Foreign Application Priority Data

Mar. 28, 2013 (JP) ................. 2013-069152

(51) Int. Cl.

| G02B 26/00 | (2006.01) |
|---|---|
| C08F 214/16 | (2006.01) |
| C08L 27/10 | (2006.01) |
| G02F 1/167 | (2006.01) |
| C08L 101/00 | (2006.01) |
| C08F 20/18 | (2006.01) |
| C08F 30/08 | (2006.01) |

(52) U.S. Cl.
CPC ............ *C08F 214/16* (2013.01); *C08F 20/18* (2013.01); *C08F 30/08* (2013.01); *C08L 27/10* (2013.01); *C08L 101/00* (2013.01); *G02F 1/167* (2013.01); *C08L 2203/20* (2013.01); *G02F 2001/1678* (2013.01)

(58) Field of Classification Search
CPC ...................................... C08F 214/16
USPC ........................................ 359/296
See application file for complete search history.

(56) References Cited

U.S. PATENT DOCUMENTS

| 4,332,487 A | 6/1982 | Bovio et al. |
|---|---|---|
| 2008/0193769 A1 | 8/2008 | Yanagisawa et al. |
| 2011/0043441 A1 | 2/2011 | Tokunaga et al. |
| 2011/0216392 A1 | 9/2011 | Baisch et al. |

(Continued)

FOREIGN PATENT DOCUMENTS

| JP | 56-30159 A | 3/1981 |
|---|---|---|
| JP | 7-316296 A | 12/1995 |

(Continued)

OTHER PUBLICATIONS

International Search Report issued in PCT/JP2013/079908, dated Dec. 24, 2013.

(Continued)

*Primary Examiner* — James Jones
(74) *Attorney, Agent, or Firm* — Birch, Stewart, Kolasch & Birch, LLP

(57) ABSTRACT

The invention relates to reflective particles containing a resin containing a structural unit derived from a compound represented by the following Formula (1), wherein in the formula (1), R represents a polymerizable group except a vinyl group, Ar represents an aromatic group, and W represents a single bond or a divalent linking group.

R—W—Ar                    Formula (1)

12 Claims, 2 Drawing Sheets

(56) References Cited

U.S. PATENT DOCUMENTS

2012/0327504 A1    12/2012  Kayashima et al.
2013/0222883 A1*   8/2013  Kayashima ............ C08L 25/02
                                                                                   359/296

FOREIGN PATENT DOCUMENTS

| JP | 2005-29766 A | 2/2005 |
|----|---|---|
| JP | 2005-241784 A | 9/2005 |
| JP | 2006-96985 A | 4/2006 |
| JP | 2009-541555 A | 11/2009 |
| JP | 2011-43712 A | 3/2011 |
| JP | 2013-174805 A | 3/2011 |
| JP | 2011-123238 A | 6/2011 |
| JP | 2011-158770 A | 8/2011 |
| JP | 2012-42497 A | 3/2012 |
| JP | 2012-173539 A | 9/2012 |
| JP | 2012-173712 A | 9/2012 |
| JP | 2013-29811 A | 11/2013 |
| JP | 2013-235262 A | 11/2013 |
| JP | 2013-236263 A | 11/2013 |

OTHER PUBLICATIONS

Written Opinion of the International Searching Authority issued in PCT/JP2013/079908, dated Dec. 24, 2013.
Japanese Office Action dated Mar. 1, 2016, issued in Japanese Patent Application No. 2013-069152.

* cited by examiner

REFLECTIVE PARTICLE, PARTICLE DISPERSION LIQUID, DISPLAY MEDIUM, AND DISPLAY DEVICE

CROSS-REFERENCE TO RELATED APPLICATIONS

This application is a continuation application of International Application No. PCT/JP2013/079908, filed Nov. 5, 2013, the disclosure of which is incorporated herein by reference in its entirety. Further, this application claims priority from Japanese Patent Application No. 2013-069152, the disclosure of which is incorporated herein by reference in their entirety.

TECHNICAL FIELD

The present invention relates to reflective particles, a particle dispersion liquid, a display medium, and a display device.

BACKGROUND ART

As a repeatedly rewritable display medium, an electrophoretic display medium has been known. An electrophoretic display medium includes, for example, a pair of substrates, a dispersing medium filled between the pair of substrates, migrant particles which migrate in the dispersing medium according to an electric field to be formed between the pair of substrates, and reflective particles constituting a back ground color As reflective particles to be applied to an electrophoretic display medium, for example, Japanese Patent Application Laid-Open (JP-A) No. 2006-096985 proposes particles containing a substance containing vinylnaphthalene as a structural unit, which yields allegedly particles exhibiting high reflectance and being stable against sedimentation in the dispersing medium.

SUMMARY OF INVENTION

Technical Problem

However, as reflective particles to be used practically for an electrophoretic display device, particles which exhibit higher reflectance than the particles disclosed in JP-A No. 2006-096985, are demanded.

An object of the invention is to provide reflective particles exhibiting high reflectance. Other object of the invention is to provide a dispersion liquid of reflective particles exhibiting high reflectance. Further object of the invention is to provide a display medium and a display device exhibiting high reflectance of a white display.

Solution to Problem

Specific means for solving the problems are as follows.
[1] Reflective particles comprising a resin containing a structural unit derived from a compound represented by the following Formula (1):

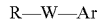 Formula (1)

wherein, in Formula (1), R represents a polymerizable group except a vinyl group, Ar represents an aromatic group, and W represents a single bond or a divalent linking group.
[2] The reflective particles according to [1], wherein, in Formula (1), R is one selected from the group consisting of a styryl group, an α-methylstyryl group, an acryloyl group, a methacryloyl group, an acrylamide group and a methacrylamide group.
[3] The reflective particles according to [1] or [2], wherein, in Formula (1), Ar is one selected from the group consisting of a benzothiazole group, a phenyl group and a phenylbenzothiazole group.
[4] The reflective particles according to any of [1] to [3], wherein, in Formula (1), W is a single bond; a linking group selected from the group consisting of the following linking groups; or a linking group selected from the group consisting of a combination of two of the following linking groups, wherein the combination may be the same or different two groups;

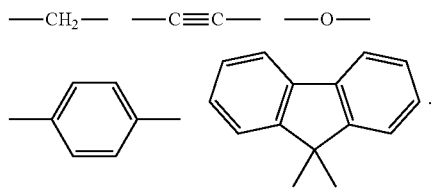

[5] The reflective particles according to any of [1] to [4], further comprising:
core particles containing a resin including a structural unit derived from a compound represented by Formula (1); and
a dispersing agent that adheres to a surface of the core particles.
[6] The reflective particles according to any of [1] to [5], wherein the resin further comprises a structural unit derived from a macromonomer.
[7] A dispersion liquid comprising the reflective particles according to any of [1] to [6] and a dispersing medium to disperse the reflective particles.
[8] A display medium comprising a pair of substrates and the dispersion liquid according to any of [1] to [7], wherein at least one of the substrates is light transmissive and the dispersion liquid is filled between the pair of substrates.
[9] A display medium comprising a pair of electrodes and a region containing the dispersion liquid according to [7], wherein at least one of the electrodes is light transmissive and the region is provided between the pair of electrodes.
[10] A display device comprising the display medium according to [8] and a voltage application unit configured to apply a voltage between the pair of substrates provided in the display medium.
[11] A display device comprising the display medium according to [9] and a voltage application unit configured to apply a voltage between the pair of electrodes provided in the display medium.

Advantageous Effects of Invention

Reflective particles exhibiting high reflectance can be provided according to the invention. Further, a dispersion liquid of reflective particles, exhibiting high reflectance can be provided according to the invention. Still further, a display medium and a display device exhibiting high reflectance in a white display can be provided according to the invention.

DESCRIPTION OF EMBODIMENTS

Figure 1:
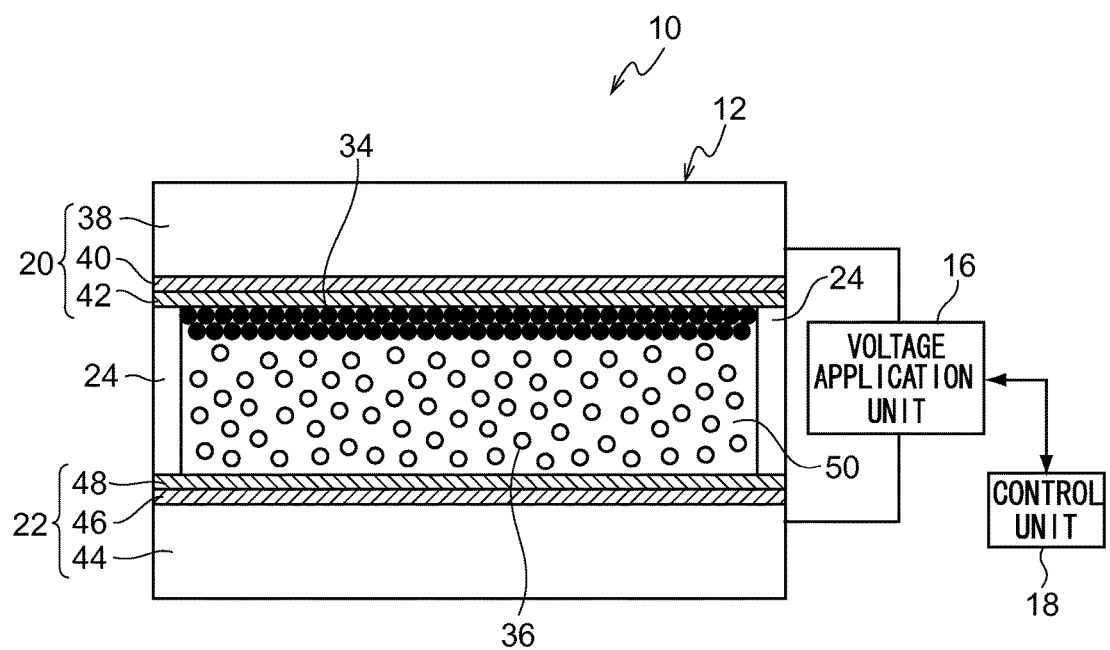
FIG. 1 is a schematic diagram of the structure of a display device according to the invention.

Embodiments of the invention will be described below. The descriptions and Examples are only for explanatory purposes and not intended to restrict in any way the scope of the invention.

The term of "(meth)acrylic" means "acrylic" and "methacrylic", the term "(meth)acrylate" means "acrylate" and "methacrylate", the term "(meth)acryloyl" means "acryloyl" and "methacryloyl", and the term "(meth)acryloxy" means "acryloxy" and "methacryloxy".

<Reflective Particles>

Reflective particles according to the invention are resin particles containing a resin including a structural unit derived from a compound represented by the following Formula (1).

R—W—Ar                    Formula (1)

In Formula (1), R represents a polymerizable group except a vinyl group, Ar represents an aromatic group, and W represents a single bond or a divalent linking group.

It is conceived that reflective particles according to the invention containing a resin including a structural unit derived from a compound represented by Formula (1) (hereinafter referred to as "specific resin") have high reflectance, because the compound has a high refractive index. Further, a display medium and a display device utilizing reflective particles according to the invention have high reflectance in a white display.

The refractive index of a compound represented by Formula (1) is preferably 1.64 or more, more preferably 1.65 or more, and further preferably 1.69 or more.

The refractive index of a compound represented by Formula (1) is a relative refractive index measured using an Abbe refractometer (for example, DR-M4, produced by Atago Co., Ltd.) in the air at a temperature of 20° C. and a measurement wavelength of 589 nm.

A component contained in reflective particles of the invention will be described below.

[Specific Resin]

A specific resin is a resin including a structural unit derived from a compound represented by the following Formula (1).

R—W—Ar                    Formula (1)

R represents a polymerizable group excluding a vinyl group ($CH_2=CH-$). As a polymerizable group excluding a vinyl group, a radically polymerizable group is preferable, and examples thereof include a styryl group ($CH_2=CH-C_6H_4-$), an α-methylstyryl group ($CH_3CH=CH-C_6H_4-$), an acryloyl group ($CH_2=CH-C(O)-$), a methacryloyl group ($CH_3CH=CH-C(O)-$), an acrylamide group ($CH_2=CH-C(O)-NH-$), and a methacrylamide group ($CH_3CH=CH-C(O)-NH-$). Among them, a styryl group, an α-methylstyryl group, an acryloyl group, and a methacryloyl group are preferable, from a viewpoint of possibility of participation in conjugation of an aromatic group represented by Ar, a styryl group and an α-methylstyryl group are more preferable, and from a viewpoint of polymerizability a styryl group is especially preferable.

When R is a styryl group or an α-methylstyryl group, in a benzene ring of the group, the orientation of an ethylenic unsaturated group, and a single bond or a divalent linking group represented by W may be any of ortho, meta, and para.

Ar represents an aromatic group. The ring structure of the aromatic group may be any of a single ring, a condensed ring, and a polycyclic ring, in which plural rings selected from a single ring and a condensed ring are connected by a single bond. Each of the single ring and the condensed ring may be a hydrocarbon ring or a heterocyclic ring. The single ring and the condensed ring may be substituted with at least one selected from a halogen atom (fluorine, chlorine, bromine, and iodine), a C1 to C4 alkyl group, a C1 to C4 alkoxy group, and a hydroxy group, and the C1 to C4 alkoxy group may be further substituted with at least one selected from a halogen atom (fluorine, chlorine, bromine, and iodine), and a hydroxy group.

Examples of condensed rings include naphthalene, phenalene, phenanthrene, anthracene, triphenylene, pyrene, chrysene, and tetracene. A heterocyclic ring may be, for example, a ring including at least one kind of atom selected from a nitrogen atom, an oxygen atom, and a sulfur atom, and examples thereof include pyridine, pyrazine, pyrimidine, pyridazine, quinoline, isoquinoline, phthalazine, naphthyridine, quinoxaline, quinazoline, cinnoline, oxazole, isoxazole, benzoxazole, thiazole, isothiazole, and benzothiazole.

Ar is preferably a benzothiazole group, a phenyl group, a phenylbenzothiazole group (a group obtained by eliminating a hydrogen atom from a benzene ring (single ring) of 2-phenylbenzothiazole), and a naphthyl group (1-naphthyl group and 2-naphthyl group), more preferably a benzothiazole group, a phenyl group, and a phenylbenzothiazole group, and further preferably a benzothiazole group and a phenyl group.

When Ar is a phenylbenzothiazole group, the bonding position of a single ring in the group and a single bond or a divalent linking group represented by W may be any of 2-position, 3-position, and 4-position in a case that 1-position is defined for the bonding position of the benzothiazole group.

W represents a single bond or a divalent linking group. For example, a divalent linking group represented by W may be one selected from the following linking groups or a combination of two or more selected from the following linking groups (the combination members may be the same or different; 2 members are desirable).

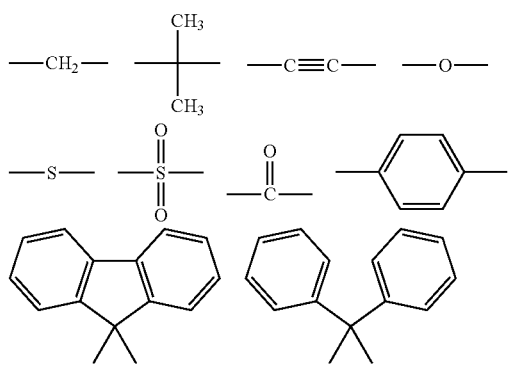

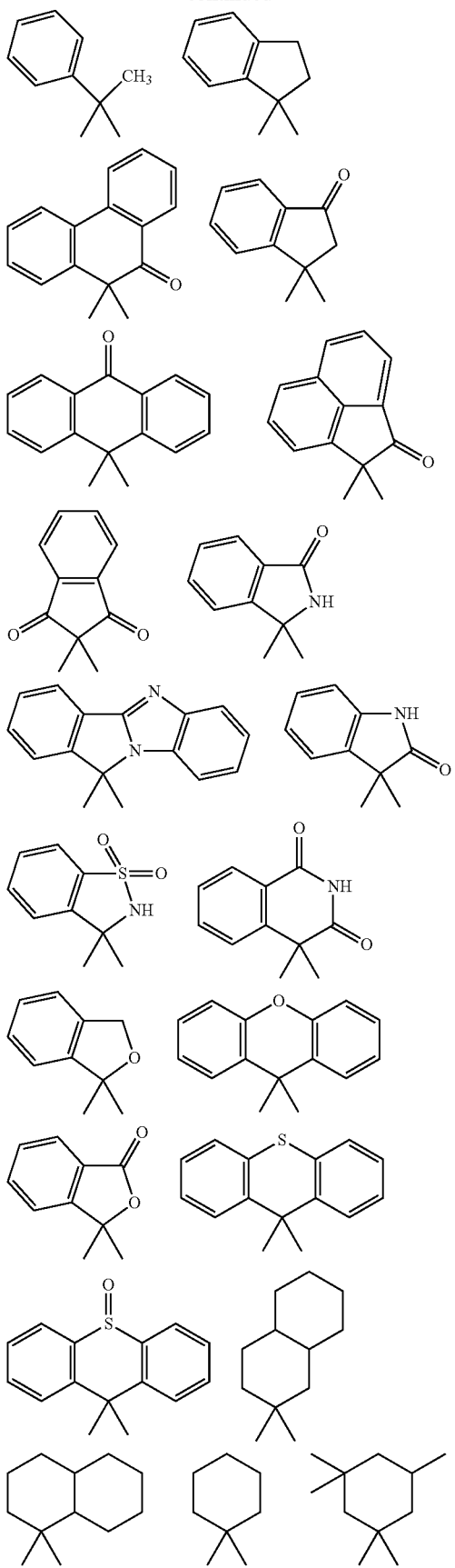

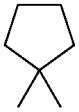

A divalent linking group represented by W is desirably one selected from the following linking groups or a combination of two or more selected from the following linking groups (the combination members may be the same or different; 2 members are desirable).

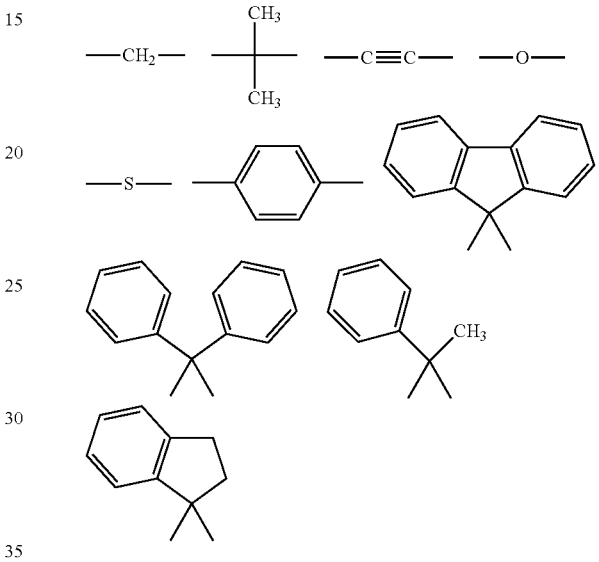

For W, from a viewpoint of the possibility of participating in the conjugation of an aromatic group represented by Ar, or from a viewpoint of not inhibiting possible conjugation between a polymerizable group excluding a vinyl group represented by R and an aromatic group represented by Ar, a single bond, one selected from the following linking groups, and a combination of two of the same linking group or two of different linking groups selected from the following linking groups are preferable; a single bond, an ethynylene (—C≡C—), and an ether bond (—O—) are more preferable; and ethynylene is further preferable.

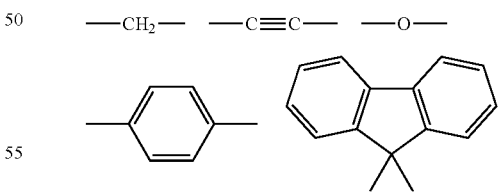

When Ar is a phenyl group or a naphthyl group, W is more preferably a divalent linking group rather than a single bond. For a divalent linking group, one selected from the linking groups represented by the following structural formulae, and a combination of two of the same linking group or two of different linking groups selected from the linking groups represented by the following structural formulas are preferable; ethynylene (—C≡C—), and an ether bond (—O—) are more preferable; and ethynylene is further preferable.

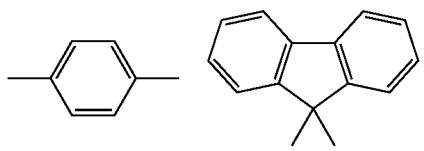
Specific examples of a compound represented by Formula (1) include the following compounds M-1 to M-16.
M-1
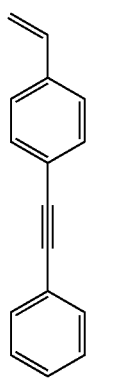
M-2
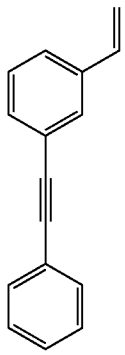
M-3
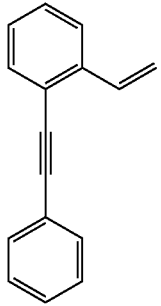
M-4
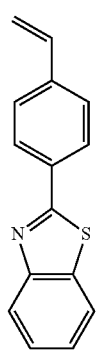
M-5
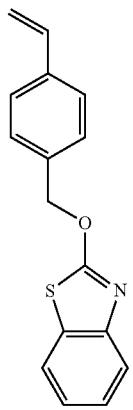
M-6
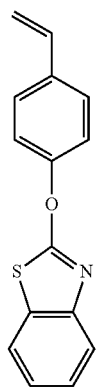
M-7
M-13
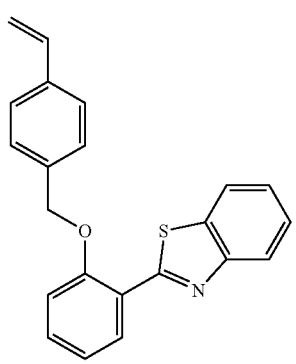

-continued

M-9 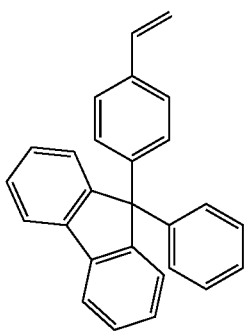

M-10 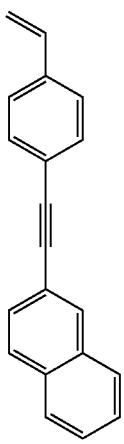

M-11 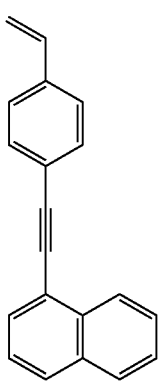

M-12 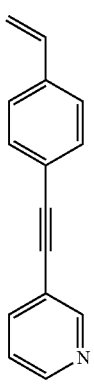

M-14 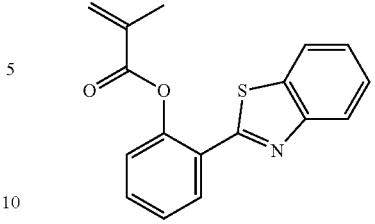

M-15 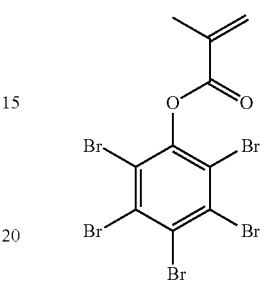

M-8 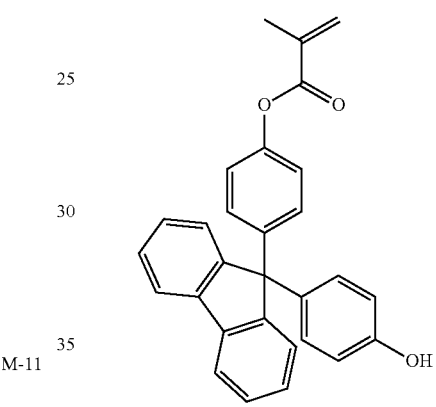

M-16 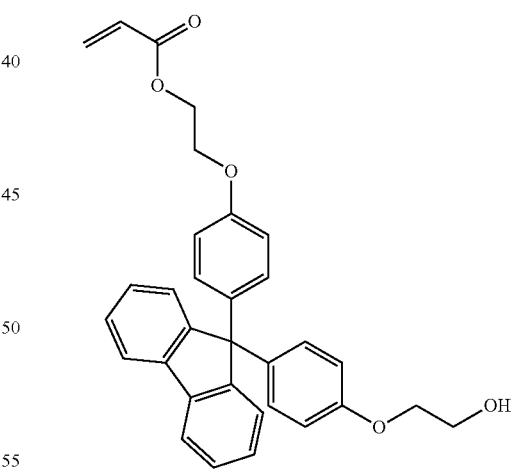

For a compound represented by Formula (1), the following combinations are desirable: R is a styryl group, an α-methylstyryl group, an acryloyl group, a methacryloyl group, an acrylamide group, or a methacrylamide group; Ar is a benzothiazole group, a phenyl group, or a phenylbenzothiazole group; and W is a single bond, one selected from the linking groups represented by the following structural formulae, or a combination of two of the same linking group or two of different linking groups selected from the linking groups represented by the following structural formulae.

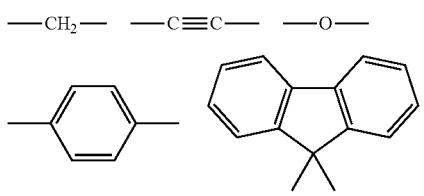

[Other Components]

Reflective particles may contain a resin other than a specific resin, for example, a polystyrene resin, a polyethylene resin, a polypropylene resin, a polycarbonate resin, a poly(methyl methacrylate) resin, an acrylic resin, and a phenol resin. However, a specific resin occupies preferably 80 mass-% or more of the total resin, more preferably occupies 90 mass-% or more, and further preferably occupies 100 mass-%.

Reflective particles may contain a white pigment, such as titanium oxide, silicon oxide, and zinc oxide for the purpose of adjustment of whiteness.

Reflective particles according to the invention can be utilized, for example, as particles constituting the back ground color of a display image in a display medium. Reflective particles according to the invention may be particles weakly responsive to an electric field (namely, particles with low mobility in response to an electric field (hereinafter referred to as "non-phoretic particles")), or particles highly responsive to an electric field (namely, particles with high mobility in response to an electric field (hereinafter referred to as "phoretic particles")).

There is no particular restriction on the average particle diameter of reflective particles, and a desirable range may be selected depending on an end use. For example, a range of the same is from 100 nm to 5000 nm, and preferably from 200 nm to 1000 nm. When the average particle diameter is from 100 nm to 5000 nm (desirably from 200 nm to 1000 nm), the particles are superior in dispersibility and favorable reflectance can be easily obtained. The above particle diameter is a volume average particle diameter.

Reflective particles according to the invention are preferably reflective particles according to the 1st Embodiment or reflective particles according to the 2nd Embodiment described below are desirable.

<Reflective Particles According to 1st Embodiment>

Reflective particles according to the 1st Embodiment include core particles containing a resin including a structural unit derived form a compound represented by Formula (1) (specific resin), and a dispersing agent adhering to a surface of the core particle. Since reflective particles constituted as above have a dispersing agent on a surface, the reflective particles are superior in dispersibility in a dispersing medium in a display medium.

[Core Particles]

Core particles contain a specific resin. Core particles may contain another resin or a white pigment as described above.

The specific resin may contain a structural unit derived from another polymerizing component, in addition to a structural unit derived from a compound represented by Formula (1). Examples of another polymerizing component include a polymerizing component (B) described below.

The mass content of a compound represented by Formula (1) in the specific resin is preferably 80 mass-% or more, more preferably 90 mass-% or more, and further preferably 100 mass-%. The above mass content is a content of the charged amount of the polymerizing component in synthesizing the specific resin.

The weight-average molecular weight of the specific resin is preferably from 500 to 1,000,000, more preferably from 1,000 to 800,000, and further preferably from 5,000 to 500,000.

[Dispersing Agent]

As a dispersing agent, a polymer having a dimethylpolysiloxane skeleton in a main-chain or a side-chain (hereinafter referred to as "a silicone chain-containing polymer") is preferable, and a polymer having a dimethylpolysiloxane skeleton in a side-chain is more preferable.

Examples of silicone chain-containing polymers include a copolymer of a polymerizing component having a silicone chain (hereinafter referred to as "silicone chain-containing polymerizing component (A)") and another polymerizing component (hereinafter referred to as "polymerizing component (B)").

—Silicone chain-containing polymerizing component (A)—

Examples of silicone chain-containing polymer (A) include a compound having a dimethylpolysiloxane skeleton (hereinafter referred to as "silicone macromonomer"). Examples of a silicone macromonomer include a dimethyl silicone compound having a (meth)acrylate group at an end, and a dimethyl silicone compound having (meth)acrylate groups at both ends. Examples of a dimethyl silicone compound having a (meth)acrylate group at an end include compounds represented by the following Formula (11), compounds represented by the following Formula (12), and compounds represented by the following Formula (13). Examples of the dimethyl silicone compound having (meth) acrylate groups at both ends include compounds represented by the following Formula (14).

Formula (11)

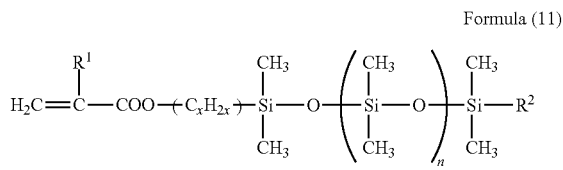

In Formula (11), $R^1$ represents a hydrogen atom or a methyl group, $R^2$ represents a hydrogen atom, a C1 to C4 alkyl group or a C1 to C4 fluoroalkyl group, n represents an integer from 0 to 1000, and x represents an integer from 1 to 3.

Formula (12)

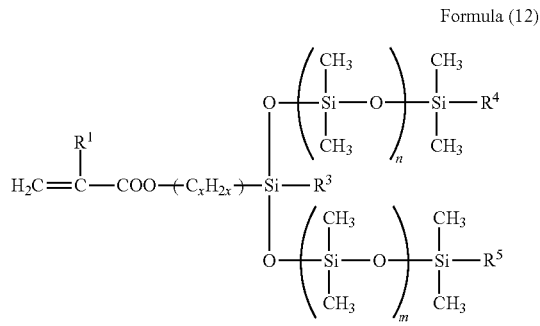

In Formula (12), $R^1$ represents a hydrogen atom or a methyl group, each of $R^3$, $R^4$, and $R^5$ independently represents a hydrogen atom, a C1 to C4 alkyl group or a C1 to C4 fluoroalkyl group, each of m and n independently represents an integer from 0 to 1000, and x represents an integer from 1 to 3.

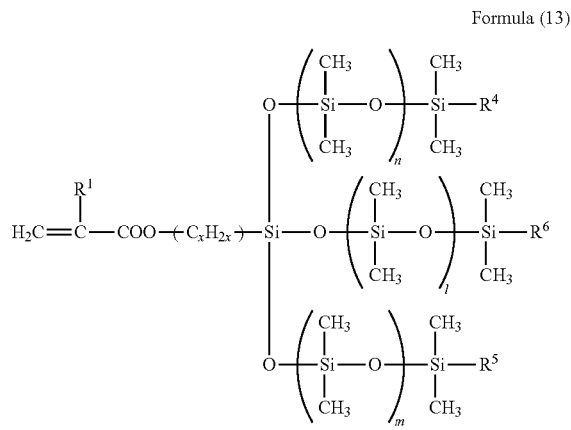

Formula (13)

In Formula (13), $R^1$ represents a hydrogen atom or a methyl group, each of $R^4$, $R^5$, and $R^6$ independently represents a hydrogen atom, a C1 to C4 alkyl group or a C1 to C4 fluoroalkyl group, each of l, m, and n independently represents an integer from 0 to 1000, and x represents an integer from 1 to 3.

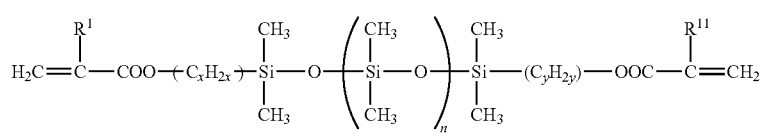

Formula (14)

In Formula (14), each of $R^1$ and $R^{11}$ independently represents a hydrogen atom or a methyl group, n represents an integer from 0 to 1000, and each of x and y independently represents an integer from 1 to 3.

Examples of compounds represented by Formula (11) include SILAPLANE FM-0711, SILAPLANE FM-0721, and SILAPLANE FM-0725 produced by JNC Corporation; and X-22-174DX, X-22-2426, and X-22-2475 produced by Shin-Etsu Chemical Co., Ltd.

Examples of compounds represented by Formula (12) include MCS-M11 produced by Gelest Inc.

Examples of compounds represented by Formula (13) include RTT-1011 produced by Gelest Inc.

Examples of compounds represented by Formula (14) include X-22-164, X-22-164AS, X-22-164A, X-22-164B, X-22-164C, and X-22-164E produced by Shin-Etsu Chemical Co., Ltd.

—Polymerizing Component (B)—

There is no particular restriction on a polymerizing component (B), insofar as it is a compound having an ethylenic unsaturated bond. By selecting a compound to be used as polymerizing component (B) out of a compound without an electrifying group, a compound with a cationic electrifying group, and a compound with an anionic electrifying group, the electrostatic property of a dispersing agent can be regulated, so that the electrostatic property of reflective particles can be regulated.

Examples of a polymerizing component (B) without an electrifying group include a (meth)acrylic acid alkyl ester, such as methyl (meth)acrylate, ethyl (meth)acrylate, propyl (meth)acrylate, and butyl (meth)acrylate; a (meth)acrylic acid aryl ester, such as benzyl (meth)acrylate and 2-phenoxyethyl (meth)acrylate; a monoolefin, such as ethylene, propylene, butylene and isobutylene; a styrenic monomer, such as styrene, α-methylstyrene and p-methylstyrene; a vinyl ester, such as vinyl acetate, vinyl propionate, vinyl benzoate and vinyl butyrate; a vinyl ether, such as methyl vinyl ether, ethyl vinyl ether and butyl vinyl ether; and a vinyl ketone, such as methyl vinyl ketone, hexyl vinyl ketone, and isopropenyl vinyl ketone.

Examples of polymerizing component (B) with a cationic electrifying group and a polymerizing component (B) with an anionic electrifying group include a monomer with a cationic group and a monomer with an anionic group to be used for synthesis of a resin for colored particles described below.

The mass content of a silicone chain-containing polymerizing component (A) in a silicone chain-containing polymer accounts for preferably 10 mass-% or more, and more preferably 20 mass-% or more. When the content is 10 mass-% or more (more desirably 20 mass-% or more), the effect as a dispersing agent can be easily attained due to a silicone chain. The mass content is at most 60 mass-% and preferably less, more preferably 50 mass-% or less, and further preferably 40 mass-% or less. The above mass content is a content of the charged amount of a polymerizing component in synthesizing a silicone chain-containing polymer.

The weight-average molecular weight of the silicone chain-containing polymer is preferably from 500 to 1,000,000, more preferably from 600 to 500,000, and further preferably from 700 to 100,000. When the weight-average molecular weight of the silicone chain-containing polymer is in the range, a dispersion liquid of which the dispersibility of particles are superior and the viscosity is low can be obtained.

Examples of commercial products of silicone chain-containing polymers include KP-541 and KP-545 produced by Shin-Etsu Chemical Co., Ltd.

Reflective particles according to the 1st Embodiment can be produced, for example, by the following method. Firstly, a compound represented by Formula (1) is polymerized in a dispersing medium which can disperse a compound represented by Formula (1) (for example, dimethyl silicone oil) in the presence of a dispersing agent to obtain a specific resin. Next, the specific resin and the dispersing agent are aggregated to produce resin particles on which the dispersing agent is precipitated on the surface. More specifically, methods described in Examples may be adopted.

<Reflective Particles According to 2nd Embodiment>

Reflective particles according to the 2nd Embodiment contain a resin (specific resin) including a structural unit derived from a compound represented by Formula (1) and a structural unit derived from a macromonomer. The term macromonomer is a general term for an oligomer (degree of polymerization from 2 to approx. 300) and a polymer, which have a polymerizable functional group, and has both polymeric and monomeric characters. Since the specific resin contained in the particles has a long main or side chain (desirably side-chain) derived from a macromonomer, reflective particles having such a constitution are superior in dispersibility in a dispersing medium in a display medium.

[Macromonomer]

Examples of macromonomers include an alkyl (meth) acrylate macromonomer, a styrene macromonomer, and a silicone macromonomer, and a silicone macromonomer is preferable.

Specific examples of alkyl (meth)acrylate macromonomers include MM-8SMA, AA-6, AS-6, AB-6, and AN-6S, produced by Toagosei Chemical Industry Co., Ltd.

A silicone macromonomer is a compound having a dimethylpolysiloxane skeleton, and is preferably a compound represented by Formula (11), a compound represented by Formula (12), a compound represented by Formula (13) or a compound represented by Formula (14). Specific examples of the same include SILAPLANE FM-0711, SILAPLANE FM-0721 and SILAPLANE FM-0725 produced by JNC Corporation; X-22-174DX, X-22-2426 and X-22-2475 produced by Shin-Etsu Chemical Co., Ltd.; MCS-M11 produced by Gelest Inc.; RTT-1011 produced by Gelest Inc.; and X-22-164, X-22-164AS, X-22-164A, X-22-164B, X-22-164C and X-22-164E produced by Shin-Etsu Chemical Co., Ltd.

The mass content of a macromonomer in a specific resin accounts for preferably 5 mass-% or more from a viewpoint of dispersibility due to a long main chain or side chain originated from the macromonomer, and more preferably 10 mass-% or more. The mass content of the macromonomer in the specific resin accounts for preferably 50 mass-% or less from a viewpoint of maintaining the high reflectance of reflective particles, and more preferably 40 mass-% or less. The above mass content is a content of the charged amount of a polymerizing component in synthesizing a specific resin.

The mass content of a compound represented by Formula (1) in a specific resin accounts for preferably at least 45 mass-% or more, more preferably 50 mass-% or more, and further preferably 55 mass-% or more. The mass content of a compound represented by Formula (1) in the specific resin accounts for preferably at most 95 mass-% or less, more preferably 80 mass-% or less, and further preferably 75 mass-% or less. The above mass content is a content of the charged amount of a polymerizing component in synthesizing the specific resin.

The specific resin may contain, in addition to a structural unit derived from a compound represented by Formula (1) and a structural unit derived from a macromonomer, a structural unit derived from another polymerizing component. Examples of another polymerizing component include the above polymerizing component (B). By selecting a compound to be used as the polymerizing component (B), the electrostatic property of the specific resin can be regulated, so that the electrostatic property of the reflective particle can be regulated. However, even when a structural unit derived from another polymerizing component is included, the mass content of the same (a content of the charged amount of a polymerizing component in synthesizing the specific resin) is preferably less than 10 mass-%, and more preferably less than 5 mass-%.

The weight-average molecular weight of the specific resin is preferably from 500 to 1,000,000, more preferably from 1,000 to 800,000, and further preferably from 5,000 to 500,000.

Reflective particles according to the 2nd Embodiment can be produced, for example, by the following method. Firstly, a compound represented by Formula (1) and a macromonomer are copolymerized in a solvent which can dissolve or disperse the compound represented by Formula (1) and the macromonomer to obtain a specific resin. Next, the specific resin is aggregated to produce resin particles. More specifically, methods described in Examples may be adopted.

<Particles Dispersion Liquid>

Particles dispersion liquid according to the invention includes particles containing reflective particles according to the invention and a dispersing medium for dispersing the particles. The particles may contain only reflective particles according to the invention, or may contain additional particles exhibiting a color other than white (hereinafter referred to as "colored particles").

[Colored Particles]

Colored particles are particles which are charged positively or negatively and move according to an electric field in a dispersing medium (pholestic particles). Display color change of an image display device occurs due to movement of colored particles in a dispersing medium.

Colored particles may contain 2 or more kinds of particles having different colors and electrification properties. "Different electrification property" means that either of charge polarity charge amount is different, or both of charge polarity and charge amount are different.

Examples of colored particles include resin particles of a thermoplastic resin or a thermosetting resin; particles constituted with resin particles and a colorant fixed on a surface thereof; resin particles containing a colorant in the resin; insulation metal oxide particles (for example, glass bead, and particles of alumina or titanium oxide); and colloidal metal particles having a plasmon color development function.

Examples of thermoplastic resins to be used for producing colored particles include a homopolymer or a copolymer of a styrenic compound, such as styrene and chlorostyrene; a monoolefin, such as ethylene, propylene, butylene and isoprene; a vinyl ester, such as vinyl acetate, vinyl propionate, vinyl benzoate and vinyl butyrate; an α-methylene aliphatic monocarboxylic acid ester, such as methyl (meth)acrylate, ethyl (meth)acrylate, butyl (meth)acrylate, dodecyl (meth) acrylate, octyl (meth)acrylate and phenyl (meth)acrylate; a vinyl ether, such as methyl vinyl ether, ethyl vinyl ether and butyl vinyl ether; and a vinyl ketone, such as methyl vinyl ketone, hexyl vinyl ketone, and isopropenyl vinyl ketone.

Examples of thermosetting resins to be used for producing colored particles include a crosslinked copolymer using divinylbenzene as a main component, a crosslinked resin such as crosslinked poly(methyl methacrylate), a phenol resin, a urea resin, a melamine resin, a polyester resin, and a silicone resin.

Examples of a typical resin to be used for producing colored particles include polystyrene, a styrene-alkyl (meth) acrylate copolymer, a styrene-acrylonitrile copolymer, a styrene-butadiene copolymer, a styrene-maleic anhydride copolymer, polyethylene, polypropylene, polyester, polyurethane, an epoxy resin, a silicone resin, polyamide, a modified rosin, and a paraffin wax.

As a resin to be used for producing colored particles, a polymer having an electrifying group is appropriate in order to electrify particles. The polymer having an electrifying group is, for example, a polymer having a cationic group or an anionic group. By a cationic group, particles are imparted with positive chargeability, and by an anionic group, particles are imparted with negatively chargeability. Examples of the cationic group as an electrifying group include an amine group, and a quaternary ammonium group (including salts thereof). Examples of an anionic group as an electrifying group include a carboxy group, a carboxylate group, a sulfonic acid group, a sulfonate group, a phosphoric acid group and a phosphate group.

Specific examples of polymers having an electrifying group include a homopolymer of a monomer having an electrifying group, and a copolymer of a monomer having an electrifying group and another monomer (monomer without an electrifying group). Examples of the monomers having an electrifying group include a monomer having a cationic group (hereinafter referred to as "cationic monomer") and a monomer having an anionic group (hereinafter referred to as "anionic monomer").

Examples of cationic monomers include the following monomers: namely, a (meth)acrylate having an aliphatic amino group, such as (N-ethylamino)ethyl (meth)acrylate, (N,N-dimethylamino)ethyl (meth)acrylate, (N,N-diethylamino)ethyl (meth)acrylate, (N,N-dibutylamino)ethyl (meth)acrylate, (N,N-hydroxyethylamino)ethyl (meth)acrylate, (N-octyl-N-ethylamino)ethyl (meth)acrylate and (N,N-dihexylamino)ethyl (meth)acrylate; a (meth)acrylamide, such as N-methylacrylamide, N-octylacrylamide, N-phenylmethylacrylamide, N-cyclohexylacrylamide, N-phenylacrylamide, N-p-methoxy-phenylacrylamide, N,N-dimethylacrylamide, N,N-dibutylacrylamide and N-methyl-N-phenylacrylamide; an ethylenic monomer substituted with an aromatic ring having a nitrogen-containing group, such as (dimethylamino)styrene, (diethylamino)styrene, (dimethylamino)methylstyrene, and (dioctylamino)styrene; and a nitrogen-containing vinyl ether monomer, such as (vinyl-N-ethyl-N-phenylamino)ethyl ether, (vinyl-N-butyl-N-phenylamino)ethyl ether, triethanolamine divinyl ether, (vinyl-diphenylamino)ethyl ether, N-vinylhydroxyethylbenzamide, and m-aminophenyl vinyl ether.

Examples of cationic monomers include also the following nitrogen-containing heterocyclic compounds: namely, a pyrrole such as N-vinylpyrrole; a pyrroline, such as N-vinyl-2-pyrroline, and N-vinyl-3-pyrroline; a pyrrolidine, such as N-vinylpyrrolidine, vinylpyrrolidine amino ether and N-vinyl-2-pyrrolidone; an imidazole such as N-vinyl-2-methylimidazole; an imidazoline such as N-vinylimidazoline; an indole such as N-vinylindole; an indoline such as N-vinylindoline; a carbazole, such as N-vinylcarbazole and 3,6-dibrom-N-vinylcarbazole; a pyridine, such as 2-vinylpyridine, 4-vinylpyridine and 2-methyl-5-vinylpyrodine; a piperidine, such as (meth)acrylic piperidine, N-vinylpiperidone and N-vinylpiperazine; a quinoline, such as 2-vinylquinoline and 4-vinylquinoline; a pyrazole, such as N-vinylpyrazole and N-vinylpyrazoline; an oxazole such as 2-vinyloxazole; and an oxazine, such as 4-vinyloxazine and morpholinoethyl (meth)acrylate.

Examples of anionic monomers include a carboxylic acid monomer, a sulfonic acid monomer, and a phosphoric acid monomer.

Examples of carboxylic acid monomers include (meth) acrylic acid, crotonic acid, itaconic acid, maleic acid, fumaric acid, citraconic acid and an anhydride thereof; a monoalkyl ester of a carboxylic acid; and a vinyl ether having a carboxy group, such as carboxyethyl vinyl ether and carboxypropyl vinyl ether, and a salt thereof.

Examples of sulfonic acid monomers include styrenesulfonic acid, 2-acrylamido-2-methylpropanesulfonic acid, 3-sulfopropyl (meth)acrylic acid ester, bis-(3-sulfopropyl) itaconic acid ester, sulfuric monoester of 2-hydroxyethyl (meth)acrylic acid, and a salt thereof.

Examples of phosphoric acid monomers include vinylphosphonic acid, vinyl phosphate, acid phosphoxyethyl (meth)acrylate, acid phosphoxypropyl (meth)acrylate, bis (methacryloxyethyl)phosphate, diphenyl-2-methacryloyloxyethyl phosphate, diphenyl-2-acryloyloxyethyl phosphate, dibutyl-2-methacryloyloxyethyl phosphate, dibutyl-2-acryloyloxyethyl phosphate and dioctyl-2-(meth) acryloyloxyethyl phosphate.

Examples of other monomers include a water-soluble monomer (for example, a monomer having a hydroxy group). Specific examples include hydroxyethyl (meth)acrylate, hydroxybutyl (meth)acrylate, glycerol mono(meth)acrylate, poly(ethylene glycol) mono(meth)acrylate and poly(propylene glycol) mono(meth)acrylate.

Examples of colorants to be used for producing colored particles include an organic pigment, an inorganic pigment and an oil-soluble dyestuff. Specific examples include a magnetic powder, such as magnetite and ferrite; carbon black; a metal oxide, such as titanium oxide, magnesium oxide and zinc oxide; and a publicly known colorant, such as a copper phthalocyanine cyan coloring material, an azo yellow coloring material, an azo magenta coloring material, a quinacridone magenta coloring material, a red coloring material, a green coloring material and a blue coloring material. More specifically, examples of colorants include aniline blue, cull coil blue, chrome yellow, ultramarine blue, Du Pont oil red, quinoline yellow, methylene blue chloride, phthalocyanine blue, malachite green oxalate, lamp black, rose bengal, C.I. Pigment red 48:1, C.I. Pigment red 122, C.I. Pigment red 57:1, C.I. Pigment yellow 97, C.I. Pigment blue 15:1 and C.I. Pigment blue 15:3.

The amount of the colorant to be used with respect to the amount of a resin contained in a colored particle is preferably from 10 mass-% to 99 mass-%, and more preferably from 30 mass-% to 99 mass-%.

Colored particles may contain a charge regulating agent. As a charge regulating agent, a publicly known material used as a toner material for electrophotography can be used, and examples of the same include cetylpyridyl chloride, a quaternary ammonium salt, a salicylic acid metal complex, a phenolic condensation product, a tetraphenyl compound, metal oxide particles, and metal oxide particles which surface is treated with any of various coupling agents.

An external additive may be adhered on to a surface of colored particles. The external additive is preferably transparent so that the color of the same does not influence the color of a colored particle.

Examples of the external additives include inorganic particles such as a metal oxide, for example, silicon oxide (silica), titanium oxide, and alumina. The external additive may be surface-treated with a coupling agent or a silicone oil in order to adjust the electrostatic property, flowability, and environmental dependency of colored particles. Examples of coupling agents include a positively electrifying coupling agent, such as an aminosilane coupling agent, an aminotitanium coupling agent and a nitrile coupling agent; and a negatively electrifying coupling agent not containing a nitrogen atom, such as a silane coupling agent, a titanium coupling agent, an epoxy silane coupling agent and an acrylic silane coupling agent. Examples of silicone oils include a positively electrifying silicone oil, such as an amino modified silicone oil; a negatively electrifying silicone oil, such as an α-methylsulfone modified silicone oil; a not-electrifying silicone oil, such as a dimethyl silicone oil, an alkyl modified silicone oil, a methyl phenyl silicone oil, a chlorophenyl silicone oil and a fluorine modified silicone oil.

A Primary particle of the external additive preferably has a diameter of from 1 nm to 100 nm, and more preferably from 5 nm to 50 nm.

The addition amount of an external additive is preferably adjusted according to a balance between the particle diameter of colored particles and the particle diameter of an external additive. When the addition amount of an external additive is excessive, at least a part of the external additive is liberated from a surface of colored particles and adhere to a surface of a different kind of colored particles, and as the result a desired electrification property cannot be attained. In general, the amount of an external additive with respect to 100 parts by mass of colored particles is preferably from 0.01 parts by mass to 3 parts by mass, and more preferably from 0.05 parts by mass to 1 part by mass.

An external additive may be added to any one of plural kinds of colored particles, or added to some or all of plural kinds of colored particles. When an external additive is added to surfaces of all the colored particles, it is preferable to strike the external additive with an impactive force to the colored particle surfaces, or to heat the colored particle surfaces, so that the external additive adheres firmly to the colored particle surfaces. By this, formation of an aggregate by aggregation of a heteropolar external additive liberated from particles is suppressed, so that deterioration of picture quality can be also suppressed.

There is no particular restriction on the size of colored particles, and a desirable range may be selected according to an end use. The volume mean diameter of colored particles is for example from 0.05 μm to 20 μm, and preferably from 0.1 μm to 10 μm.

There is no particular restriction on the concentration of colored particles in a particle dispersion liquid, insofar the concentration gives a desired display color, and it is preferably, for example, from 0.01 mass-% to 50 mass-%.

The concentration of colored particles in a particle dispersion liquid is preferably also in the range, when the same is filled between a pair of substrates of an image display device. It is effective to regulate the concentration of colored particles in an image display device in order to realize a desired hue according to the distance between a pair of substrates. In other words, when the distance between the pair of substrates of an image display device is larger, the concentration of colored particles is made lower, and when the distance is smaller, the concentration of colored particles is made higher.

As a method for producing colored particles, any of heretofore known methods may be applied. For example, a method, by which a resin is heated to a molten state and a pigment or a charge regulating agent is added thereto and dispersed by mixing, the mixture is cooled and then ground by a grinder to prepare particles, and then the particles are dispersed in a dispersing medium, is applicable. Further, a method, by which particles containing a pigment or a charge regulating agent are prepared by a polymerization method, such as suspension polymerization, emulsion polymerization, and dispersion polymerization, or an emulsion coagulation method, and the particles are dispersed in a dispersing medium, is applicable. Further, a method, by which a resin, a pigment, and a charge regulating agent are heated in a dispersing medium to a molten state, and the molten mixture is cooled with stirring to solidify and precipitate, utilizing the temperature dependency of solubility of the resin in the solvent medium, thereby particles are prepared, is applicable. Further, a method, by which a material is charged into a container provided with particulate media for dispersion and kneading (for example, an attritor, or a ball mill), the container is kept in a desirable temperature range (for example, from 80° C. to 160° C.), and the material is dispersed and kneaded to prepare particles, is applicable.

[Dispersing Medium]

A dispersing medium is preferably an insulating liquid. The term "insulating" means that a volume resistivity value is $10^{11}$ Ωcm or higher.

Favorable examples of insulating liquids include hexane, cyclohexane, toluene, xylene, decane, hexadecane, kerosene, paraffin, isoparaffin, a silicone oil, high purity petroleum, ethylene glycol, an alcohol, an ether, an ester, dimethylformamide, dimethylacetamide, dimethyl sulfoxide, 1-methyl-2-pyrrolidone, N-methylformamide, acetonitrile, tetrahydrofuran, propylene carbonate, ethylene carbonate, benzine, diisopropylnaphthalene, an olive oil, trichlorotrifluoroethane, tetrachloroethane, and dibromotetrafluoroethane, as well as a mixture thereof.

As a dispersing medium, a silicone oil is preferable. As a silicone oil, a silicone oil in which a hydrocarbon group is bonded to a siloxane bond (for example, dimethyl silicone oil, diethyl silicone oil, methyl ethyl silicone oil, methyl phenyl silicone oil, and diphenyl silicone oil), is preferable, and dimethyl silicone is especially preferable.

To a dispersing medium, an acid, an alkali, a salt, a dispersion stabilizer, an antioxidant, a UV absorber, an antibacterial agent, a preservative, etc. may be added, provided, however, that the same should preferably be added such that the volume resistivity value falls within the above range.

To a dispersing medium, as a charge regulating agent, a nonionic surfactant, a cationic surfactant, an anionic surfactant, an amphoteric surfactant (betaine surfactant), a fluorochemical surfactant, a silicone surfactant, a metal soap, an alkyl phosphate, a succinimide, etc. may be added.

Examples of nonionic surfactants include a polyoxyethylene nonylphenyl ether, a polyoxyethylene octylphenyl ether, a polyoxyethylene dodecylphenyl ether, a polyoxyethylene alkyl ether, a polyoxyethylene fatty acid ester, a sorbitan fatty acid ester, a polyoxyethylene sorbitan fatty acid ester, and a fatty acid alkylol amide. Examples of cationic surfactants include a primary amine salt, a secondary amine salt, a tertiary amine salt, and a quaternary ammonium salt. Examples of anionic surfactants include an alkyl benzene sulfonate, an alkyl phenyl sulfonate, an alkyl naphthalene sulfonate, a higher fatty acid salt, a sulfate of a higher fatty acid ester, and a sulfonate of a higher fatty acid ester.

The content of a charge regulating agent with respect to the total solid content of the particles is preferably from 0.01 mass-% to 20 mass-%, and more preferably from 0.05 mass-% to 10 mass-%. When the content of a charge regulating agent is 0.01 mass-% or more, the charge regulating effect can be easily exhibited, and when the same is 20 mass-% or less, excessive increase in the electrical conductivity of a dispersing medium is suppressed.

To a dispersing medium, a polymer may be added. As such a polymer, a polymer gel or a high molecular weight polymer may be also used.

From a viewpoint of suppression of sedimentation of reflective particles, the specific gravity of a dispersing medium at a temperature of 25° C. is preferably from 0.6 g/cm³ to 1.2 g/cm³, more preferably from 0.7 g/cm³ to 1.1 g/cm³, and further preferably from 0.7 g/cm³ to 1.0 g/cm³.

The viscosity of a dispersing medium at a temperature of 20° C. is preferably from 0.1 mPa·s to 100 mPa·s, more preferably from 0.1 mPa·s to 50 mPa·s, and further preferably from 0.1 mPa·s to 20 mPa·s. The viscosity of a dispersing medium can be regulated by regulating the molecule structure, molecular weight, composition, etc. of a dispersing medium.

<Display Medium, and Display Device>

A first embodiment of a display medium according to the invention is provided with a pair of substrates, at least one of which is light transmissive, and a particle dispersion liquid according to the invention filled between the pair of substrates.

A first embodiment of a display device according to the invention is provided with the first embodiment of a display medium according to the invention and a voltage application unit for applying a voltage between a pair of substrates provided in the display medium.

A second embodiment of a display medium according to the invention is provided with a pair of electrodes, at least one of which is light transmissive, and a region provided between the pair of electrodes retaining a particle dispersion liquid according to the invention.

A second embodiment of a display device according to the invention is provided with the second embodiment of a display medium according to the invention and a voltage application unit for applying a voltage between a pair of electrodes provided in the display medium.

An exemplary Embodiment of a display medium and a display device according to the invention will be described below referring to drawings.

Figure 2A:
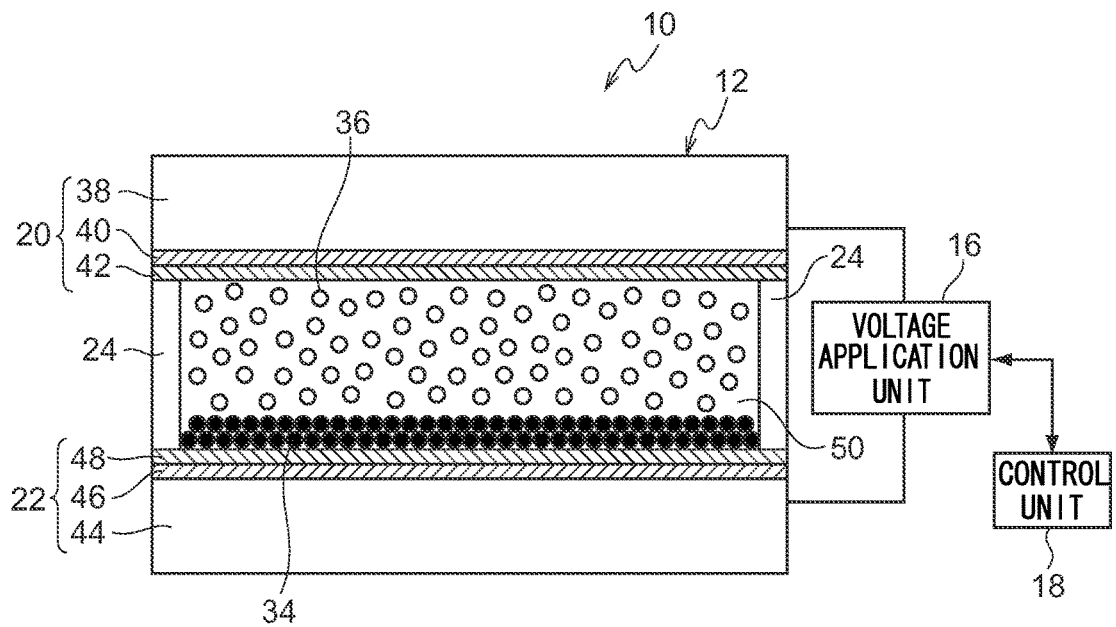
FIG. 2A is a schematic diagram of a migrating mode of particles when a voltage is applied between substrates of a display medium provided in a display device according to the invention.
Figure 2B:
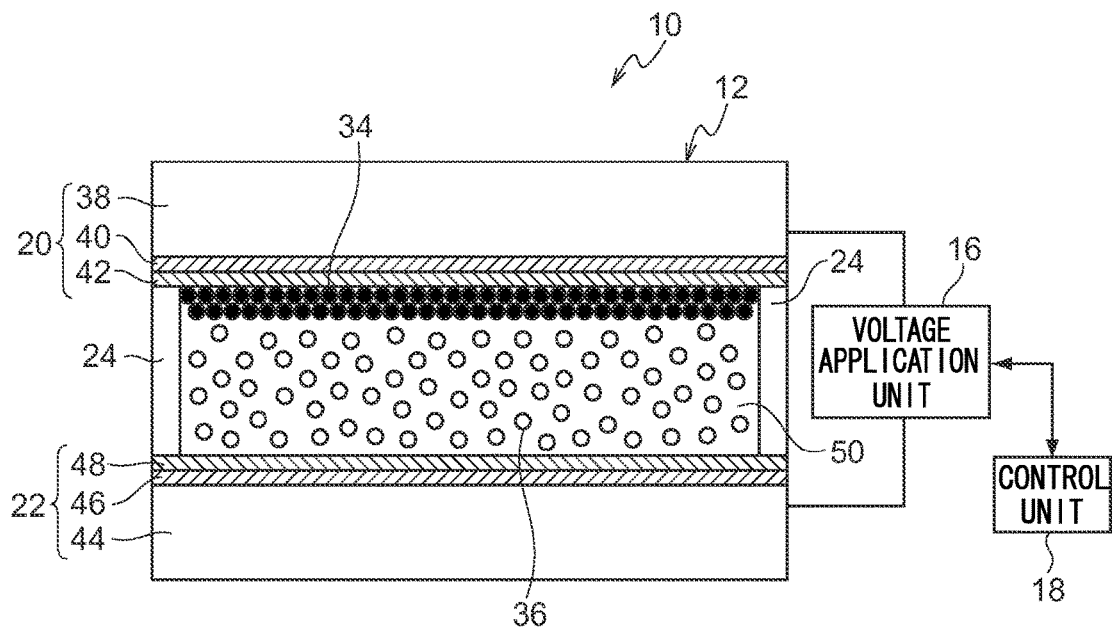
FIG. 2B is a schematic diagram of a migrating mode of particles when a voltage is applied between substrates of a display medium provided in a display device according to the invention.

FIG. 1 is a schematic diagram of the structure of a display device according to the Embodiment. FIG. 2A and FIG. 2B are schematic diagrams of a migrating mode of a particle swarm when a voltage is applied between substrates of a display medium provided in a display device according to the Embodiment.

FIG. 1, FIG. 2A, and FIG. 2B are diagrams focused on a single cell. The Embodiment will be described below using the diagrams focused on a single cell.

A display device 10 according to the Embodiment is provided as shown in FIG. 1 with a display medium 12, a voltage application unit 16 for applying a voltage to the display medium 12, and a control unit 18 for controlling driving of the voltage application unit 16.

[Display Medium]

The display medium 12 is provided with a display substrate 20, a rear substrate 22, a spacer member 24, a dispersing medium 50, colored particles 34, and reflective particles 36. The display substrate 20 is an image display surface of the display medium 12. The rear substrate 22 faces the display substrate 20 with a gap. The spacer members 24 retain a space between the substrates (between the display substrate 20 and the rear substrate 22) at a predetermined gap and comparts the space between the substrates into a plurality of cells. The dispersing medium 50, the colored particles 34, and the reflective particles 36 are filled in each cell.

The cell means a region surrounded by the display substrate 20, the rear substrate 22, and the spacer members 24. In the cell, the dispersing medium 50, the colored particles 34, and the reflective particles 36 are filled, and the colored particles 34 and the reflective particles 36 are dispersed in the dispersing medium 50.

The colored particles 34 moves between the substrates of the display substrate 20 and the rear substrate 22 according to an electric field intensity generated in a cell. The following description is based on an assumption that a colored particles 34 has a predetermined color and is prepared to be positively-charged or negatively-charged in advance.

The reflective particles 36 may be either of non-phoretic particles or phoretic particles. The reflective particles 36 may be applied as particles constituting the back ground color of a display image. Although a case in which the reflective particles 36 are non-phoretic particles is described in the following, without limitation thereto.

The display device 10 utilizes reflective particles according to the invention as particles for the reflective particles 36, and utilizes a particle dispersion liquid according to the invention as a particle dispersion liquid (a particle dispersion liquid containing the dispersing medium 50, the colored particles 34, and the reflective particles 36) filled in the display medium 12.

There is no particular restriction on the mass content of the colored particles 34 with respect to the total components filled in a cell (the concentration of the colored particles 34), insofar as it is a concentration to exhibit a desired hue, and it may be adjusted according to the cell thickness (namely, the distance between the display substrate 20 and the rear substrate 22). In other words, to obtain a desired hue, the thicker a cell is, the lower the concentration is adjusted; and the thinner a cell is, the higher the concentration is adjusted. Generally, the concentration of the colored particles 34 is from 0.01 mass-% to 50 mass-%.

A cell is preferably comparted by the spacer members 24 corresponding to each pixel for displaying an image on the display medium 12, and by this, the display medium 12 can display at each pixel.

The size of a cell has close relationship with the resolution of the display medium 12, and in general a smaller cell gives higher resolution of the display medium 12. As for the size of a cell, the length in a planar direction of the display substrate 20 is, for example, approx. from 10 μm to 1 mm.

[Substrate]

The display substrate 20 includes a support substrate 38, and a front surface electrode 40 and a surface layer 42 layered one on another on the support substrate 38. The rear substrate 22 includes a support substrate 44, and a rear surface electrode 46 and a surface layer 48 layered one on another on the support substrate 44. The surface layer 42 and the surface layer 48 are dispensable.

The display substrate 20 has light transmissiveness. "Light transmissiveness" means that the transmittance of visible light is 60% or more. The rear substrate 22 may have, but is not required to have light transmissiveness.

Examples of materials for the support substrate 38 and the support substrate 44 include glass, a poly(ethylene terephthalate) resin, a polycarbonate resin, an acrylic resin, a polyimide resin, a polyester resin, an epoxy resin, and a polyethersulfone resin.

Each of the front surface electrode 40 and the rear surface electrode 46 is, for example, a monolayer film, a mixture film, or a composite film using as a material an oxide of a metal, such as indium, tin, cadmium, and antimony; a complex oxide such as such as ITO (indium tin oxide); a metal, such as gold, silver, copper, and nickel; or an organic material, such as polypyrrole, and polythiophene. The thickness of the front surface electrode 40 and the rear surface electrode 46 is preferably, for example, from 100 Å to 2000

A. The front surface electrode 40 and the rear surface electrode 46 may be formed in a matrix shape or a stripe shape.

The front surface electrode 40 and the rear surface electrode 46 may be embedded in the support substrate 38 and the support substrate 44 respectively. The front surface electrode 40 and the rear surface electrode 46 may be separated from the display substrate 20 and the rear substrate 22 respectively and placed outside the display medium 12.

Each of the display substrate 20 and the rear substrate 22 may be driven by an active matrix method by placing an electrode on either of the two.

Each of the support substrate 38 and the support substrate 44 may be provided with a TFT (thin film transistor) at each pixel for conducting active matrix driving. In this case, a TFT is preferably formed not on the display substrate 20 but on the rear substrate 22, because it becomes easier to laminate a wiring or to mount a device.

The surface layer 42 and the surface layer 48 are provided on the front surface electrode 40 and the rear surface electrode 46 respectively. Examples of materials for the surface layer 42 and the surface layer 48 include polycarbonate, polyester, polystyrene, polyimide, an epoxy resin, polyisocyanate, polyamide, poly(vinyl alcohol), polybutadiene, poly(methyl methacrylate), a nylon copolymer, an ultraviolet-curing acrylic resin, and a fluorocarbon resin. Each of the surface layer 42 and the surface layer 48 may further contain a charge transport substance or contain a self-supporting resin having a charge transport property, in addition to the above resins.

[Spacer Member]

Examples of materials for the spacer member 24 include a thermoplastic resin, a thermosetting resin, an electron beam curable resin, a light curable resin, a rubber and a metal.

The spacer member 24 may be formed integrally with either or both of the display substrate 20 and the rear substrate 22. In this case the spacer member 24 is formed by processing the support substrate 38 or the support substrate 44 by an etching treatment, a laser machining treatment, a pressing treatment, a printing treatment, or the like.

The spacer member 24 is preferably colorless and transparent from a viewpoint of suppression of a negative influence on a display image displayed on the display medium 12. As a material for the spacer member 24, a transparent resin, such as polystyrene, polyester, and an acrylic resin, is preferable. A spacer member 24 may be in a particle form, and in this case the spacer member 24 is preferably transparent resin particles or transparent glass particles. "Transparent" means that transmittance of visible light is 60% or more.

For fixing the display substrate 20 and the rear substrate 22 by the intermediary of the spacer member 24, a fixing unit, such as a combination of bolt and nut, a clamp, a clip, and a fixing frame, is used. Alternatively, they may be fixed by an adhesive, heat sealing, ultrasonic bonding, etc.

[Display Device]

As shown in FIG. 1, the display device 10 is provided with the display medium 12, the voltage application unit 16 for applying a voltage to the display medium 12, and the control unit 18 for controlling driving of the voltage application unit 16.

The voltage application unit 16 is electrically connected with the front surface electrode 40 and the rear surface electrode 46. Further, the voltage application unit 16 is connected with the control unit 18 so as to transmit/receive a signal.

Although an aspect where both of the front surface electrode 40 and the rear surface electrode 46 are electrically connected with the voltage application unit 16 is described below, an aspect where one of the front surface electrode 40 and the rear surface electrode 46 is grounded and the other is connected with the voltage application unit 16 is also allowable.

The voltage application unit 16 is a voltage application device for applying a voltage to the front surface electrode 40 and the rear surface electrode 46, and applies a voltage according to regulation by the control unit 18 between the front surface electrode 40 and the rear surface electrode 46.

The control unit 18 may be a microcomputer including a CPU (central processing unit) governing the overall operation of the device, a RAM (random access memory) storing temporarily various data, and a ROM (read only memory) having stored in advance various programs such as a control program for controlling the entire device.

Next, the action of the display device 10 will be described. The following description is based on an assumption that the dispersing medium 50 is transparent, the colored particles 34 are positively-charged, and the reflective particles 36 are not charged. In this case, the display medium 12 displays a white back ground color by the reflective particles 36 and a color of the colored particles 34 due to displacement of the same. The following action is described for explanatory convenience' sake starting from a state in which the colored particles 34 adhere to the side of the rear substrate 22 (state shown in FIG. 2A).

The control unit 18 outputs an actuating signal to the voltage application unit 16 directing application of a voltage for a predetermined time so that the front surface electrode 40 becomes a negative electrode and the rear surface electrode 46 becomes a positive electrode. When the voltage applied between the electrodes increases, the positively-charged colored particles 34 are moved toward the display substrate 20 arriving at the display substrate 20 (state shown in FIG. 2B). When the application between the electrodes is finished, the colored particles 34 are retained on the side of the display substrate 20, and the color exhibited by the colored particles 34 is visible from the side of the display substrate 20.

Next, the control unit 18 outputs an actuating signal to the voltage application unit 16 directing application of a voltage with inverted voltage polarity for a predetermined time so that the front surface electrode 40 becomes a positive electrode and the rear surface electrode 46 becomes a negative electrode. When the voltage applied between the electrodes increases, the positively-charged colored particles 34 are moved toward the rear substrate 22 arriving at the rear substrate 22 (state shown in FIG. 2A). When the application between the electrodes is finished, the white color exhibited by the reflective particles 36 are visible from the side of the display substrate 20, while the colored particles 34 are retained on the side of the rear substrate 22. The colored particles 34 are hidden by the reflective particles 36, and the color exhibited by the colored particles 34 become hardly visible.

Information concerning voltage application time, which the control unit 18 outputs to the voltage application unit 16 may be stored in advance in a memory such as a ROM in the control unit 18. The information is read out, when a processing is to be executed.

As described above, a display is performed in the display device 10, when the colored particles 34 arrives at the display substrate 20 or the rear substrate 22 and adhere thereto.

With respect to a display medium 12 and a display device 10 according to the Embodiment, an aspect in which a display substrate 20 is provided with a front surface electrode 40, a rear substrate 22 is provided with a rear surface electrode 46, and a voltage is applied between the electrodes (namely between the substrates) to move colored particles 34 between the substrates for a display, is described above, but without limitation thereto, and an aspectin which, for example, a display substrate 20 is provided with a front surface electrode 40, a spacer member 24 is provided with a electrode, and a voltage is applied between the electrodes to move colored particles 34 between the display substrate 20 and the spacer member 24 to display, may be also applied.

With respect to a display medium 12 and a display device 10 according to the Embodiment, an aspect in which 1 kind (1 color) of particles are provided as colored particles 34, is described above, but without limitation thereto, an aspect in which 2 kinds (2 colors) or more of particles are provided as a combination of those different in charge polarity or in a threshold voltage, may be also applied. Specific examples include an aspect in which as the colored particles 34 positively chargeable 1st particles, negatively chargeable 2nd particles, and positively chargeable 3rd particles different from the 1st particles in terms of the threshold voltage and a larger particle diameter are provided.

<Electronic Device, Etc. Employing the Invention>

A display medium and a display device according to the invention can be employed in an electronic device, an exhibition medium, a card medium, etc. Specifically, a display medium and a display device according to the invention can be employed, for example, in an electronic bulletin board, an electronic circular notice, an electronic blackboard, an electronic advertisement, a digital signage, a flashing marker device, an electronic paper, an electronic newspaper, an electronic book, an electronic document sheet to be used with a copying machine and a printer, a portable computer, a tablet computer, a cell phone, a smart card, a signing device, a clock, a shelf label, and a flash drive, which can store and rewrite an image.

EXAMPLES

Although the invention will be described in more detail below by way of Examples, the invention is not limited to the Examples.

The term "part" in the following description is based on mass unless otherwise specified.

Synthesis of Compound Represented by Formula (1)

Synthesis of Monomer M-1

Firstly, 35.0 g (191 mmol) of 4-bromo styrene dissolved in 30 mL of anhydrous trimethylamine, 28.5 g (279 mmol) of phenyl acetylene, 0.44 g (2.32 mmol) of copper(I) iodide, and 0.57 g (2.18 mmol) of triphenylphosphine were mixed and stirred flowing nitrogen for purging at room temperature for 1 hour. Next, 1.39 g (1.98 mmol) of bis(triphenylphosphine)palladium(II) chloride was added and the mixture was stirred at 70° C. for 76 hours. A precipitate was removed by filtration, and a solvent was removed by evaporation under a reduced pressure from the reaction solution. The reaction solution was diluted with hexane, then subjected to liquid separating operations successively with water, 2N hydrochloric acid, and a saturated aqueous solution of sodium chloride, and purified by a silica gel column to obtain 28.1 g of monomer M-1.

Synthesis of Monomer M-4

Into a 200 mL-three neck flask equipped with a stirring chip, a nitrogen feed tube, and a condenser, 25.0 g (168.5 mmol) of p-vinylbenzoic acid was charged and cooled to 0° C. flowing nitrogen for purging. Thereto 83.3 g (700.2 mmol) of thionyl chloride was dropped over 30 min, and stirred at room temperature for 4 hours. Thereafter, the mixture was further stirred at 40° C. for 1 hour, and then stirred under a reduced pressure for 2 hours to obtain p-vinylbenzoyl chloride.

Into a 500 mL-three neck flask equipped with a stirring chip, a nitrogen feed tube, and a condenser, 21.1 g (168.5 mmol) of 2-aminothiophenol and 110 mL of N-methyl-2-pyrrolidone were charged and cooled to 0° C. in a nitrogen atmosphere. Thereto 28.1 g (168.5 mmol) of p-vinylbenzoyl chloride was dropped over 30 min, and stirred at room temperature for 30 min. Thereafter, dibutylhydroxytoluene was added as a catalyst, and the temperature was raised to 100° C. allowing to react for 1 hour. The reaction solution was left standing to cool down to room temperature, and then poured into water to precipitate a solid. The solid was recovered by adding a 1 N aqueous solution of sodium hydroxide, adjusting the pH to 7, and followed by filtration. After purification by silica gel column chromatography, 18.6 g of monomer M-4 was obtained.

Synthesis of Monomer M-13

A 1 L-three neck flask equipped with at the respective necks a stirring blade, a reflux tube connected with a nitrogen line, and a flat head plug was prepared. Into the three neck flask, 51.7 g (339 mmol) of 4-(chloromethyl)styrene, 70.0 g (308 mmol) of 2-(2-hydroxyphenyl)benzothiazole, 63.8 g (462 mmol) of potassium carbonate, 4.34 g (15.4 mmol) of tetrabutylammonium chloride, and 616 mL of dimethylsulfoxide were charged, and the inside was replaced with nitrogen 3 times. Then the flask was stirred in a water bath at 50° C. for 2 hours while flowing nitrogen, to which 1.4 g (9.2 mmol) of 4-(chloromethyl)styrene was added, and the flask was further stirred at 50° C. for 1 hour. The reaction solution was poured into 1.5 of water to precipitate a solid. The solid was recovered by aspiration filtration, and purified by column chromatography to obtain a monomer M-13.

Synthesis of Monomer M-14

Into a 200 mL-three neck flask equipped with a stirring chip, a nitrogen feed tube, and a condenser, 15 g (66.0 mmol) of 2-(2-hydroxyphenyl)benzothiazole, 40 mL of tetrahydrofuran, and 15 mL of trimethylamine were charged and cooled to 0° C. Thereto 9.66 g (92.4 mmol) of methacrylic acid chloride was dropped over 30 min and the mixture was stirred at room temperature for 3 hours. A precipitate was filtrated and subjected to liquid separating operations successively with ethyl acetate and water. The organic layer was collected and concentrated under a reduced pressure. The concentrate was purified by silica gel column chromatography to obtain 18.2 g of monomer M-14.

Synthesis of Monomer M-16

Into a 200 mL-three neck flask equipped with a stirring chip, a nitrogen feed tube, and a condenser, 15.0 g (34.2 mmol) of 9,9-bis[4-(2-hydroxyethoxy)phenyl]fluorene, 40 mL of tetrahydrofuran, and 15 mL of trimethylamine were charged and cooled to 0° C. Thereto 5.0 g (47.9 mmol) of methacrylic acid chloride was dropped over 30 min and the mixture was stirred at room temperature for 3 hours. A precipitate was filtrated and subjected to liquid separating operations successively with ethyl acetate and water. The organic layer was collected and concentrated under a reduced pressure. The concentrate was purified by silica gel column chromatography to obtain 15.1 g of monomer M-16.

Synthesis of Dispersing Agent

Synthesis of Dispersing Agent D-1 (Silicone Chain-Containing Polymer)

Into a 200 mL-three neck flask equipped with a condenser, a nitrogen feed tube, and a stirring rod, 20 g of SILAPLANE FM-0721 (produced by JNC Corporation), 80 g of styrene, and 150 g of toluene were charged, mixed, and heated to 75° C. while flowing nitrogen. Thereto 0.4 g of lauroyl peroxide dissolved in 1 g of toluene was added allowing to react for 2 hours, and 0.2 g of lauroyl peroxide dissolved in 0.5 g of toluene was further added allowing to react for another 6 hours. The reaction solution was left standing to cool and poured into methanol to precipitate a polymer thereby obtaining a dispersing agent D-1.

Synthesis of Dispersing Agents D-2 to D-5 (Silicone Chain-Containing Polymers)

Dispersing agents D-2 to D-5 were synthesized by the same method as for the dispersing agent D-1, except that the polymerizing components were changed as shown in Table 1.

TABLE 1

| Dispersing agent | Polymerizing component | | | Content (mass-%) | | | Molecular weight |
|---|---|---|---|---|---|---|---|
| | A | B1 | B2 | A | B1 | B2 | |
| D-1 | FM-0721 | Styrene | — | 20 | 80 | 0 | 67,100 |
| D-2 | FM-0725 | Styrene | — | 50 | 50 | 0 | 25,600 |
| D-3 | FM-0711 | Methyl methacrylate | — | 30 | 70 | 0 | 154,300 |
| D-4 | FM-0721 | Styrene | Methacrylic acid | 25 | 70 | 5 | 9,600 |
| D-5 | FM-0721 | Styrene | 2-(Dimethylamino)ethyl methacrylate | 22 | 70 | 8 | 1,286,000 |

<Production of Reflective Particles According to 1st Embodiment>

Example 1

Production of Particles P-1

Into a 200 mL-three neck flask equipped with a condenser, a nitrogen feed tube, and a stirring rod, 10.0 g of monomer M-1, and 0.36 g of an alkyl acrylate/dimethicone copolymer (KP-541, produced by Shin-Etsu Chemical Co., Ltd.) as a dispersing agent, 30.0 g of dimethyl silicone oil (KF-96L-1CS, produced by Shin-Etsu Chemical Co., Ltd.), and 10.0 g of toluene were charged, and heated to 75° C. with stirring under a nitrogen gas atmosphere. After confirming that the solution became uniform, 0.1 g of lauroyl peroxide dissolved in 0.2 g of toluene was added and stirred for 2 hours. Next, 0.05 g of lauroyl peroxide dissolved in 0.2 g of toluene was added allowing to react for another 6 hours, thereby obtaining a white suspension. Particles were sedimented by centrifugation, and after removing a supernatant, a dimethyl silicone oil (KF-96L-2CS, produced by Shin-Etsu Chemical Co., Ltd.) was added. This operation was repeated 4 times to obtain particles P-1 dispersed in the dimethyl silicone oil.

Examples 2 to 9

Production of Particles P-2 to P-9

Particles P-2 to P-9 were produced by the same production method as for the particle P-1, except that monomers and dispersing agents were changed as shown in Table 2.

[Comparative Examples 1 and 2: Production of particles P-C1 and P-C2]

Particles P-C1 and P-C2 were produced by the same production method as for the particle P-1, except that monomers and dispersing agents were changed as shown in Table 2.

<Production of Reflective Particle According to 2nd Embodiment>

Example 11

Production of Particles P-11

Into a 200 mL-three neck flask equipped with a condenser, a nitrogen feed tube, and a stirring rod, 10.0 g of monomer M-1, and 4.3 g of SILAPLANE FM-0721 (produced by JNC Corporation) as a macromonomer, and 39.6 g of ISOPAR M (isoparaffin solvent, produced by Exxon Mobil Corp.) were charged, and heated to 60° C. with stirring in a nitrogen atmosphere. After confirming that the solution became uniform, 0.1 g of lauroyl peroxide dissolved in 0.2 g of ISOPAR M was added and stirred for 2 hours. Next, 0.05 g of lauroyl peroxide dissolved in 0.2 g of ISOPAR M was added allowing to react for another 6 hours, thereby obtaining a white suspension. Particles were sedimented by centrifugation, and after removing a supernatant, a dimethyl silicone oil (KF-96L-2CS, produced by Shin-Etsu Chemical Co., Ltd.) was added. This operation was repeated 4 times to obtain particles P-11 dispersed in the dimethyl silicone oil.

Examples 12 to 19

Production of Particles P-12 to P-19

Particles P-12 to P-19 were produced by the same production method as for the particle P-11, except that monomers and macromonomers were changed as shown in Table 3.

Comparative Examples 11 to 13

Production of Particles P-C11 to P-C13

Particles P-C11 to P-C13 were produced by the same production method as for the particle P-11, except that monomers and macromonomers were changed as shown in Table 3.

The details of the macromonomers described in Table 3 are as follows:
FM-0721: SILAPLANE FM-0721, produced by JNC Corporation, compound represented by Formula (11)

FM-0725: SILAPLANE FM-0725, produced by JNC Corporation, compound represented by Formula (11)
FM-0711: SILAPLANE FM-0711, produced by JNC Corporation, compound represented by Formula (11)
x-22-164B: produced by Shin-Etsu Chemical Co., Ltd., compound represented by Formula (14)
MM-8SMA: produced by Toagosei Chemical Industry Co., Ltd., stearyl methacrylate macromonomer <Production of Cyan Particles>

Firstly, 95 parts of SILAPLANE FM-0711 (produced by JNC Corporation), 3 parts of methyl methacrylate, and 2 parts of glycidyl methacrylate, were mixed with 50 parts of dimethyl silicone oil (KF-96 L-1CS, produced by Shin-Etsu Chemical Co., Ltd.), to which 0.5 part of azobisvaleronitrile was added as a polymerization initiator allowing to initiate a polymerization reaction. Thus, a silicone polymer having an epoxy group was produced. The weight-average molecular weight of the polymer was 600,000.

A 3 mass-% silicone oil solution of the silicone polymer was prepared. As a silicone oil, a dimethyl silicone oil (KF-96L-2CS, produced by Shin-Etsu Chemical Co., Ltd.) was used.

A copolymer of N-vinyl pyrrolidone and N,N-diethylaminoethyl acrylate (mass ratio 9:1, weight-average molecular weight 60,000) was synthesized through a radical solution polymerization to obtain a polymer having an electrifying group.

With 1 part of an aqueous pigment dispersion (UNISPERSE, pigment content of 26 mass-%, cyan colored, produced by Ciba Specialty Chemicals) 3 parts of a 10 mass-% aqueous solution of the polymer having an electrifying group was mixed. The mixed solution was mixed with 10 parts of a 3 mass-% silicone oil solution of a silicone polymer, and the mixture was dispersed by agitation with an ultrasonic disintegrator for 10 min to prepare a suspension.

The suspension was heated (70° C.) under a reduced pressure (2 KPa) to remove moisture to obtain a silicone oil dispersion liquid in which colored particles containing a polymer having an electrifying group and a pigment are dispersed. By heating the dispersion liquid at 100° C. for 3 hours, silicone polymers in a colored particle were bonded together.

Next, butyl bromide in an amount equivalent to 50% of a molar amount of N,N-diethylaminoethyl acrylate in the solid content of particles was added to the dispersion liquid, and the mixture was heated at 80° C. for 3 hours for a quaternization treatment of an amino group. Thereafter, the particles were sedimented by a centrifuge, and rinse with a dimethyl silicone oil and sedimentation were repeated for purification.

Thus, cyan particles dispersion liquid with the particle solid content of 5 mass-% was obtained. The volume mean diameter of the cyan particles measured with a laser diffraction scattering particle size analyzer (LA-300, produced by Horiba, Ltd.) was 380 nm.

The charge polarity of the cyan particles in the dispersion liquid, evaluated by filling the dispersion liquid between 2 electrode substrates and applying a direct current voltage, and then observing the migrant direction, was positive charge.

<Evaluations>

The following evaluations were performed for reflective particles of each Example and each Comparative Example. Empty cells to be used for evaluations were prepared as follows.

On a glass substrate provided with a film of 50 nm-thick ITO (indium tin oxide) formed by a sputtering method as an electrode, a solution of a fluorocarbon resin (CYTOP, produced by Asahi Glass Co., Ltd.) was spin-coated and dried at 130° C. for 1 hour to form a 80 nm-thick surface layer. Two sheets of the ITO substrate with a surface layer were prepared for a display substrate and a rear substrate. Next, the rear substrate and the display substrate were layered using a 50 μm-TEFLON (registered trademark) sheet as a spacer, such that the surface layers faced each other, and the assembly was fixed with a clip to complete a cell.

[Refractive Index]

Each of monomer M-1, monomer M-4, monomer M-13, monomer M-14, monomer M-16, 2-vinylnaphthalene, and styrene was dissolved in dimethylacetamide to concentrations of 10 mass-%, 30 mass-%, and 50 mass-%. The refractive index (%) of a sample of each concentration was measured with an Abbe refractometer (DR-M4, produced by Atago Co., Ltd.) in the air at a temperature of 20° C. with a measurement wavelength of 589 nm, and a refractive index at a concentration of 100% was calculated using the slope of refractive index with respect to concentration. The results are shown in Table 2 and Table 3.

[Average Particle Diameter]

The average particle diameter (volume mean diameter, nm) of reflective particles was measured with a NANOTRAC UPA (produced by Nikkiso Co., Ltd.). The results are shown in Table 2 and Table 3.

[Charge Amount]

A dispersion liquid of reflective particles was prepared such that the solid concentration became 20%, and filled in the evaluation cell to obtain a device sample. A voltage of ±15 V was applied between the electrodes of a device sample with a function generator (a power source produced by NF Circuit Design Bloc was driven by LABVIEW produced by National Instruments Corporation), and the charge amount of reflective particles was examined with an ampere meter (Keithley Instruments Inc.) and a spectrometer (USB2000, produced by Ocean Optics Incorporated). The charge amount of reflective particles (initial charge amount: $nC/cm^2$) was obtained by applying a 0 V-15 V-square wave and integrating the electric charge amount until a time point where the current value leveled off. The results are shown in Table 2 and Table 3.

[Reflectance]

A dispersion liquid of reflective particles was prepared such that the solid concentration became 20%, and filled in the evaluation cell to obtain a device sample. Then the reflection density was measured from the display substrate side with a spectrophotometer (X-RITE 939, produced by X-Rite, Incorporated) as the reflectance (%) in a white display. The evaluation criteria were as follows, and ratings D and E are levels having difficulty in a practical use. The results are shown in Table 2 and Table 3.

—Evaluation Criteria—
A: Over 45%
B: Higher than 42% and not higher than 45%
C: Higher than 38% and not higher than 42%
D: Higher than 33% and not higher than 38%
E: Not higher than 33%

[Dispersibility]

A dispersion liquid of reflective particles, a dispersion liquid of cyan particles, and a dimethyl silicone oil (KF-96L-2CS, produced by Shin-Etsu Chemical Co., Ltd.) were mixed such that the solid concentration of the reflective particles became 20 mass-%, and the solid concentration of the cyan particles became 1 mass-%. The mixture dispersion liquid was filled in an evaluation cell to obtain a device sample. The device sample was placed vertically on a laboratory table, and left standing at room temperature for 2 days. Then the device sample was observed macroscopically and under a light microscope (zoom lens VH-Z100, magnification 700-fold, produced by Keyence Corporation) to examine a degree of sedimentation of the reflective particles. The evaluation criteria were as follows, and rating C is a level having difficulty in a practical use. The results are shown in Table 2 and Table 3.

—Evaluation Criteria—

A: Sedimentation of reflective particles was not recognized even by observation under a light microscope.
B: Sedimentation of reflective particles was not recognized by macroscopic observation, but recognized by observation under a light microscope.
C: Sedimentation of reflective particles was recognized even by macroscopic observation.

TABLE 2

| | | Compound represented by Formula (1) or Comparative compound | | | Reflective particles | | | Particle dispersion liquid Dispersibility |
|---|---|---|---|---|---|---|---|---|
| | Reflective particles | Kind | Refractive index | Dispersing agent | Average particle diameter (nm) | Charge amount (nC/cm$^2$) | Reflectance | |
| Examples | 1 P-1 | M-1 | 1.69 | KP-541 | 630 | 0.30 | A | A |
| | 2 P-2 | M-1 | 1.69 | D-1 | 350 | 0.47 | A | A |
| | 3 P-3 | M-1 | 1.69 | D-3 | 620 | 0.44 | A | A |
| | 4 P-4 | M-1 | 1.69 | D-5 | 1460 | 7.55 | A | B |
| | 5 P-5 | M-4 | 1.69 | D-2 | 510 | 0.68 | A | A |
| | 6 P-6 | M-13 | 1.68 | D-2 | 320 | 0.59 | B | A |
| | 7 P-7 | M-13 | 1.68 | D-4 | 410 | 3.98 | B | A |
| | 8 P-8 | M-14 | 1.67 | KP-541 | 480 | 0.36 | B | A |
| | 9 P-9 | M-16 | 1.64 | KP-541 | 750 | 0.79 | C | A |
| Comparative Examples | 1 P-C1 | 2-Vinyl naphthalene | 1.63 | KP-541 | 460 | 0.31 | D | A |
| | 2 P-C2 | Styrene | 1.55 | KP-541 | 430 | 0.65 | E | A |

TABLE 3

| | | | | Polymerizing component of specific resin | | | | | | |
|---|---|---|---|---|---|---|---|---|---|---|
| | | (I) Compound represented by Formula (1) or Comparative compound | | | | | Reflective particles | | | Particle dispersion liquid Dispersibility |
| | Reflective particles | Kind | Refractive index | (II) Macromonomer | Content (mass-%) (I) | (II) | Average particle diameter (nm) | Charge amount (nC/cm$^2$) | Reflectance | |
| Examples | 11 P-11 | M-1 | 1.69 | FM-0721 | 70 | 30 | 510 | 0.65 | A | A |
| | 12 P-12 | M-1 | 1.69 | FM-0721 | 95 | 5 | 1,840 | 0.30 | A | B |
| | 13 P-13 | M-1 | 1.69 | x-22-1648 | 90 | 10 | 530 | 0.42 | A | A |
| | 14 P-14 | M-4 | 1.69 | FM-0721 | 45 | 55 | 600 | 0.68 | B | A |
| | 15 P-15 | M-4 | 1.69 | FM-0725 | 85 | 15 | 380 | 0.30 | A | A |
| | 16 P-16 | M-4 | 1.69 | MM-8SMA | 70 | 30 | 1,310 | 0.30 | A | B |
| | 17 P-17 | M-13 | 1.68 | FM-0711 | 70 | 30 | 340 | 0.31 | B | A |
| | 18 P-18 | M-14 | 1.67 | FM-0721 | 70 | 30 | 620 | 0.66 | B | A |
| | 19 P-19 | M-16 | 1.64 | FM-0721 | 70 | 30 | 730 | 0.48 | C | A |
| Comparative Examples | 11 P-C11 | 2-Vinyl naphthalene | 1.63 | FM-0721 | 70 | 30 | 760 | 0.56 | D | A |
| | 12 P-C12 | 2-Vinyl naphthalene | 1.63 | MM-8SMA | 97 | 3 | 5,500 | 0.30 | E | C |
| | 13 P-C13 | Styrene | 1.55 | FM-0721 | 70 | 30 | 510 | 0.35 | E | A |

As obvious from the results shown in Table 2 and Table 3, the reflectance in a white display in Examples was higher than in Comparative Examples.

The disclosure of Japanese Patent Application No. 2013-069152 filed on Mar. 28, 2013 is hereby incorporated by reference herein in its entireties.

All the literature, patent literature, and technical standards cited herein are also herein incorporated to the same extent as provided for specifically and severally with respect to an individual literature, patent literature, and technical standard to the effect that the same should be so incorporated by reference.

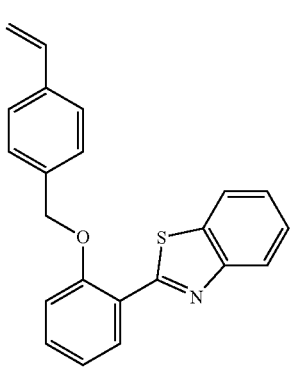

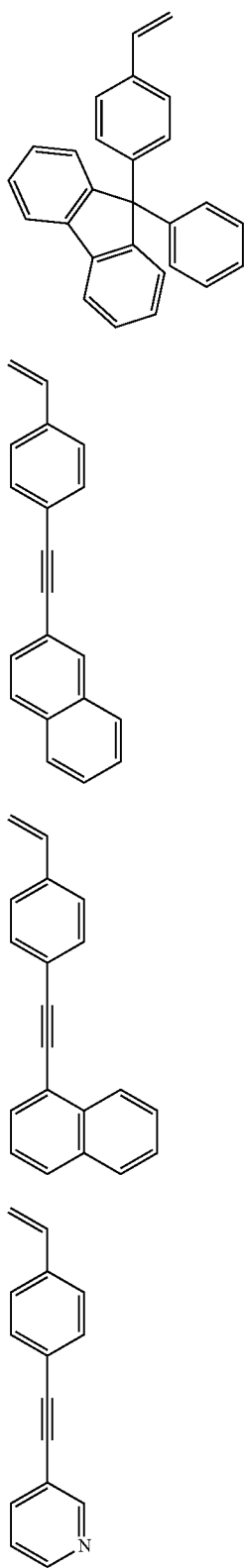
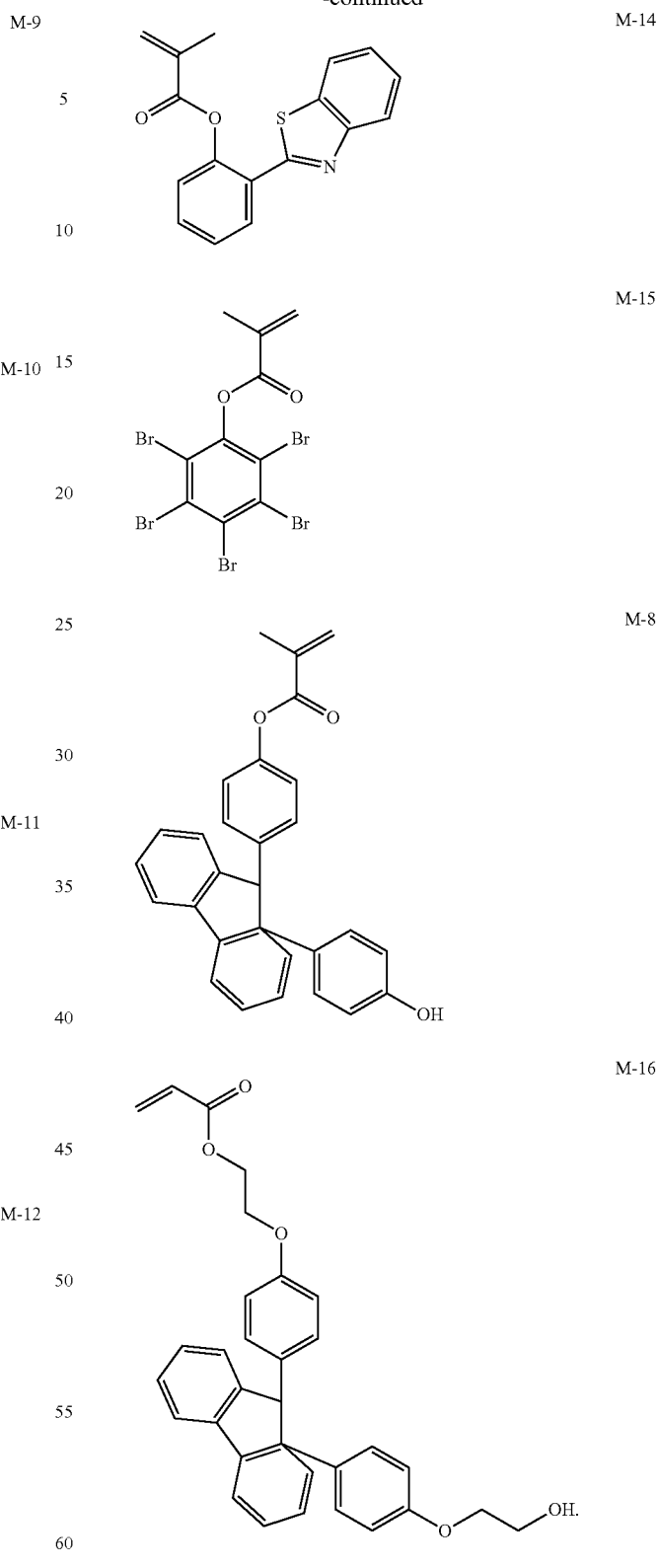

The invention claimed is:

1. Reflective particles comprising a resin containing a structural unit derived from a compound represented by the following Formula (1):

R—W—Ar         Formula (1)

wherein, in Formula (1), R represents a polymerizable group except a vinyl group, Ar represents an aromatic group, and W represents a divalent linking group selected from the group consisting of the following linking groups, except phenylene group, or a linking group selected from the group consisting of a combination of two of the following linking groups, wherein the combination may include the same two groups or two different groups:

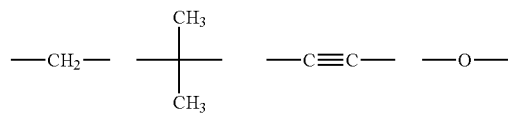

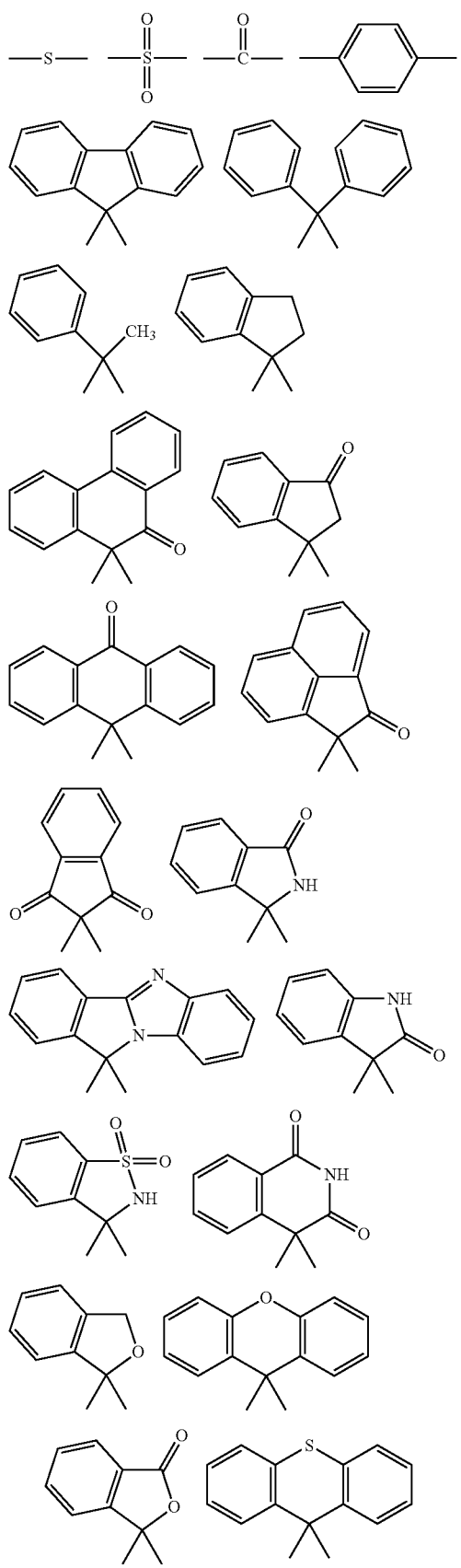

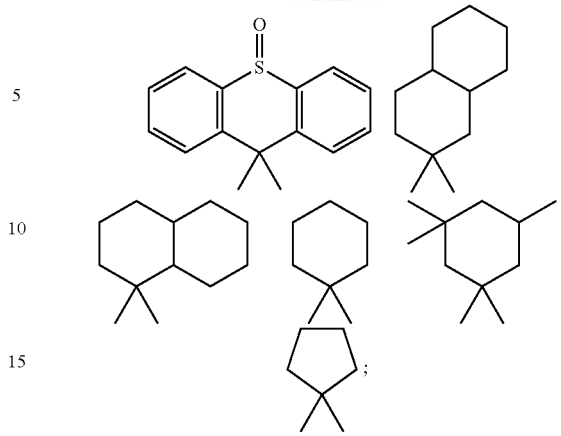

and
wherein a refractive index of the compound represented by Formula (1) is 1.65 or more.

2. The reflective particles according to claim 1, wherein, in Formula (1), R is one selected from the group consisting of a styryl group, an α-methylstyryl group, an acryloyl group, a methacryloyl group, an acrylamide group and a methacrylamide group.

3. The reflective particles according to claim 1, wherein, in Formula (1), Ar is one selected from the group consisting of a benzothiazole group, a phenyl group and a phenylbenzothiazole group.

4. The reflective particles according to claim 1, wherein, in Formula (1), W is a linking group selected from the group consisting of the following linking groups:

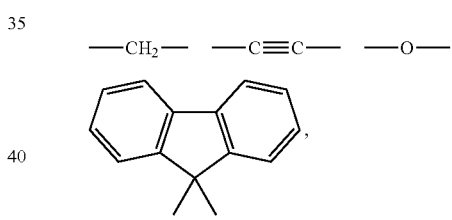

or a linking group selected from the group consisting of a combination of two of the following linking groups, wherein the combination may include the same two groups or two different groups:

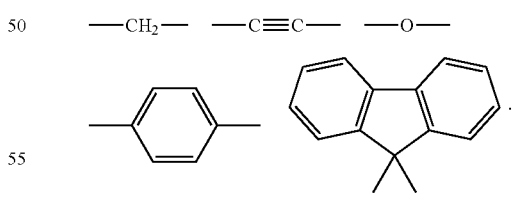

5. The reflective particles according to claim 1, further comprising:
core particles containing a resin including a structural unit derived from a compound represented by Formula (1); and
a dispersing agent that adheres to a surface of the core particles.

6. The reflective particles according to claim 1, wherein the resin further comprises a structural unit derived from a macromonomer.

7. A dispersion liquid comprising the reflective particles according to claim 1 and a dispersing medium to disperse the reflective particles.

8. A display medium comprising a pair of substrates and the dispersion liquid according to claim 7, wherein at least one of the substrates is light transmissive and the dispersion liquid is filled between the pair of substrates.

9. A display medium comprising a pair of electrodes and a region containing the dispersion liquid according to claim 7, wherein at least one of the electrodes is light transmissive and the region is provided between the pair of electrodes.

10. A display device comprising the display medium according to claim 8 and a voltage application unit configured to apply a voltage between the pair of substrates provided in the display medium.

11. A display device comprising the display medium according to claim 9 and a voltage application unit configured to apply a voltage between the pair of electrodes provided in the display medium.

12. The reflective particles according to claim 1, wherein the compound represented by Formula (1) is selected from the group consisting of the following compounds M-1 to M-6 and M-8 to M-16:

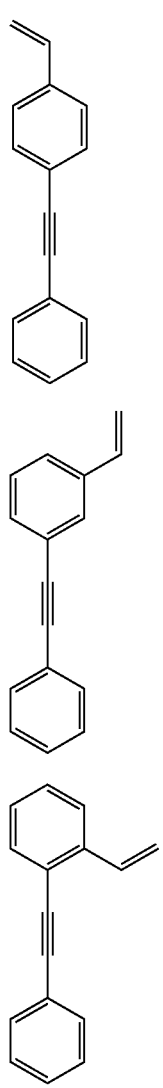

M-1

M-2

M-3

M-4

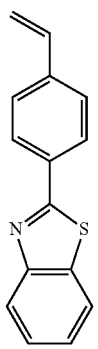

M-5

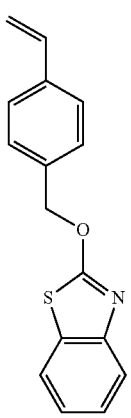

M-6

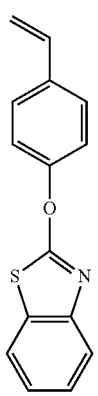

M-13